United States Patent
Langlois et al.

(10) Patent No.: US 10,251,034 B2
(45) Date of Patent: Apr. 2, 2019

(54) PROPAGATION OF APPLICATION CONTEXT BETWEEN A MOBILE DEVICE AND A VEHICLE INFORMATION SYSTEM

(71) Applicants: BLACKBERRY LIMITED, Waterloo (CA); 2236008 Ontario Inc., Waterloo (CA)

(72) Inventors: Michael George Langlois, Almonte (CA); Benjamin Allan Johnson, Ottawa (CA)

(73) Assignees: BlackBerry Limited, Waterloo (CA); 2236008 Ontario Inc., Ontario (CA)

( * ) Notice: Subject to any disclaimer, the term of this patent is extended or adjusted under 35 U.S.C. 154(b) by 541 days.

(21) Appl. No.: 13/974,658

(22) Filed: Aug. 23, 2013

(65) Prior Publication Data
US 2014/0280580 A1    Sep. 18, 2014

Related U.S. Application Data

(60) Provisional application No. 61/792,143, filed on Mar. 15, 2013.

(51) Int. Cl.
*H04W 4/70* (2018.01)
*B60K 37/06* (2006.01)

(52) U.S. Cl.
CPC .............. *H04W 4/70* (2018.02); *B60K 37/06* (2013.01); *B60K 2350/355* (2013.01); *B60K 2350/357* (2013.01)

(58) Field of Classification Search
CPC ...................................................... H04W 4/00
USPC ........................................................ 709/204
See application file for complete search history.

(56) References Cited

U.S. PATENT DOCUMENTS

| | | |
|---|---|---|
| 8,005,987 B2 | 8/2011 | Richardson et al. |
| 8,171,137 B1 | 5/2012 | Parks et al. |
| 8,224,894 B1 | 7/2012 | Parks et al. |
| 8,260,879 B2 | 9/2012 | Chan |
| 2001/0044805 A1 | 11/2001 | Multer et al. |
| 2002/0156911 A1 | 10/2002 | Croman et al. |
| 2003/0167318 A1 | 9/2003 | Robbin et al. |
| 2007/0054627 A1 | 3/2007 | Wormald |
| 2008/0320190 A1 | 12/2008 | Lydon et al. |
| 2009/0284476 A1 | 11/2009 | Bull et al. |
| 2010/0220250 A1 | 9/2010 | Vanderwall et al. |
| 2010/0295803 A1 | 11/2010 | Kim et al. |

(Continued)

FOREIGN PATENT DOCUMENTS

WO    2012136332    10/2012

OTHER PUBLICATIONS

EPO, Extended European Search Report relating to Application No. 14159301.2, dated Jul. 28, 2015.

(Continued)

*Primary Examiner* — Kevin S Mai
(74) *Attorney, Agent, or Firm* — Rowand LLP

(57) ABSTRACT

A method, device, and a vehicle information system are provided for persisting application context from the mobile device to the vehicle information system. An operating context is determined for at least one application executing on the mobile device. A user interface view for display by the vehicle information system is generated and provided to the vehicle information system. The user interface view comprises at least one application user interface element associated with the at least one application, and the application user interface element comprises an application entry point defined by the operating context for the at least one application.

22 Claims, 18 Drawing Sheets

(56) References Cited

U.S. PATENT DOCUMENTS

| | | |
|---|---|---|
| 2011/0029644 A1 | 2/2011 | Gelvin et al. |
| 2011/0112969 A1 | 5/2011 | Zaid et al. |
| 2011/0185390 A1 | 7/2011 | Faenger et al. |
| 2011/0219105 A1* | 9/2011 | Kryze .................... G06F 15/16 709/223 |
| 2011/0296037 A1 | 12/2011 | Westra et al. |
| 2012/0078440 A1 | 3/2012 | Oravis et al. |
| 2012/0095643 A1 | 4/2012 | Bose et al. |
| 2012/0192109 A1 | 7/2012 | Stolle et al. |
| 2012/0250858 A1 | 10/2012 | Iqbal et al. |
| 2012/0254960 A1 | 10/2012 | Lortz et al. |
| 2012/0282913 A1 | 11/2012 | Kaindl et al. |
| 2012/0290657 A1 | 11/2012 | Parks et al. |
| 2012/0290669 A1 | 11/2012 | Parks et al. |
| 2013/0013148 A1 | 1/2013 | Park |
| 2013/0041790 A1 | 2/2013 | Murugesan et al. |
| 2013/0045677 A1 | 2/2013 | Chien |
| 2013/0066832 A1 | 3/2013 | Sheehan et al. |
| 2013/0176328 A1* | 7/2013 | Pillai ................. G01C 21/3632 345/592 |
| 2014/0106726 A1* | 4/2014 | Crosbie ................ H04W 4/046 455/418 |
| 2015/0339031 A1* | 11/2015 | Zeinstra ................ B60K 37/06 715/747 |
| 2018/0032997 A1* | 2/2018 | Gordon ............. G06Q 20/3224 |

OTHER PUBLICATIONS

IdeaSwarm, LLC., "Handoff: Push pages, maps and more to your iPhone and iPad", 2010, pp. 1-2, URL: http://www.handoffapp.com/, accessed Aug. 23, 2013.

* cited by examiner

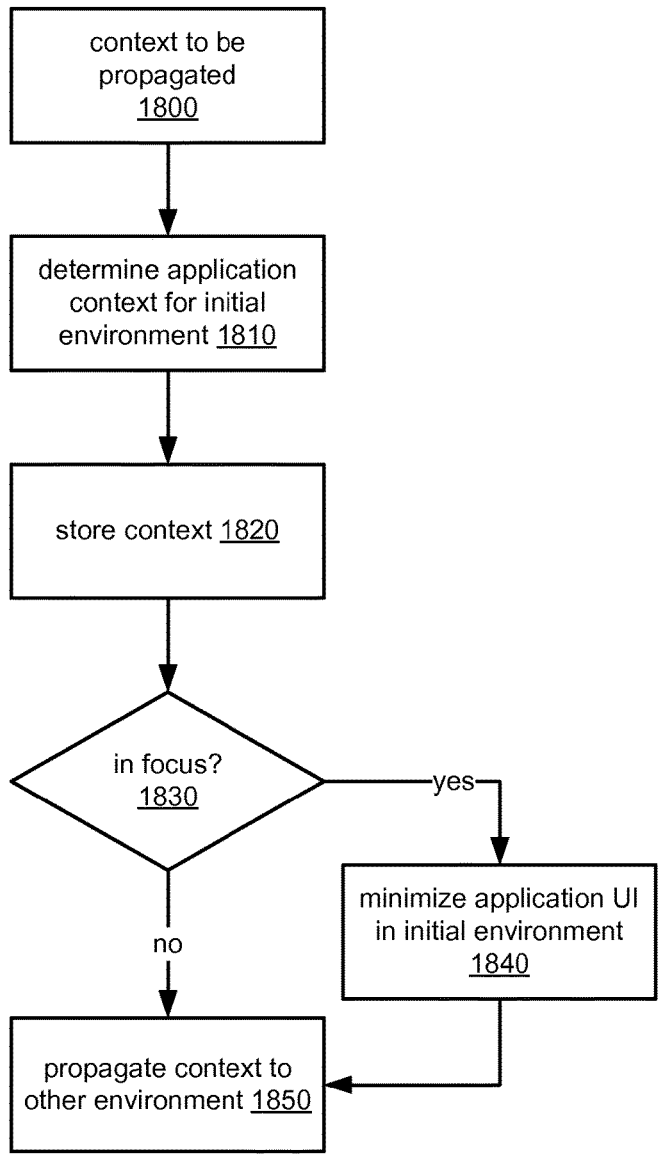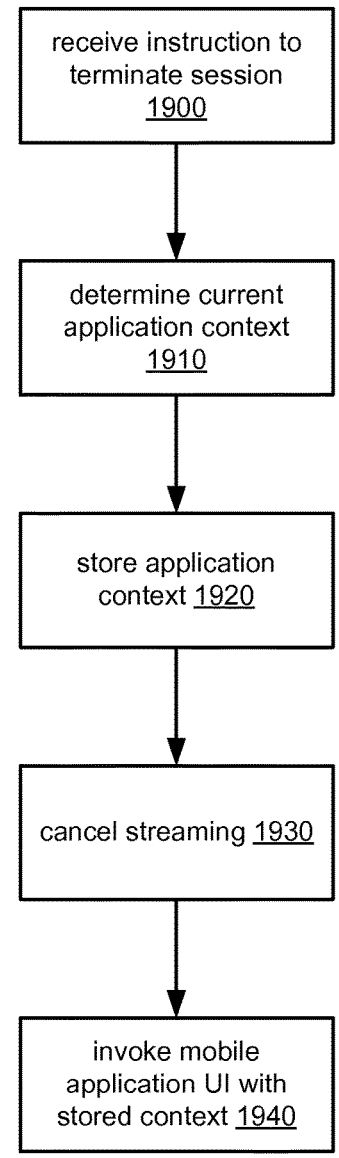
FIG. 18
FIG. 19

PROPAGATION OF APPLICATION CONTEXT BETWEEN A MOBILE DEVICE AND A VEHICLE INFORMATION SYSTEM

CROSS-REFERENCE TO RELATED APPLICATIONS

This application claims priority to U.S. Provisional Application No. 61/792,143 filed on 15 Mar. 2013, the entirety of which is incorporated herein by reference.

TECHNICAL FIELD

The present disclosure relates to integration of mobile device operations with a vehicle information system and display.

TECHNICAL BACKGROUND

Vehicles commonly include a number of electronics systems and subsystems for operation of the vehicle and for driver and passenger convenience, including entertainment, informational and environmental systems including audio, climate control, voice command, navigation, and engine monitoring systems. Control over and/or monitoring of the various systems can be provided via the user interfaces of an in-vehicle information system. The user interface can include one or more outputs such as display panels and speakers, and one or more input devices (e.g., dials, buttons, and the like), a microphone for receiving voice commands, and/or a touchscreen display for receiving input touch commands. The in-vehicle system is typically integrated in the vehicle's dashboard within easy reach of the driver.

In-vehicle information systems can be connected with portable user devices, such as mobile phones and the like, via wired or wireless connections in order to expand the functionality of the in-vehicle information system. For example, the mobile phone can be used to place a telephone call, and audio data from the phone can be streamed to the in-vehicle information system's speakers; using the speakers and a microphone, the driver may participate in a telephone conversation hands-free. As another example, audio data on a portable user device such as a mobile phone, MP3 player or other entertainment device can be streamed to the in-vehicle information system and played back over the vehicle's speakers.

BRIEF DESCRIPTION OF THE DRAWINGS

In drawings which illustrate by way of example only embodiments of the present disclosure, in which like reference numerals describe similar items throughout the various figures.

FIG. 18 is a flowchart illustrating a method of propagating application context between the mobile device and the in-vehicle information system.

FIG. 19 is a flowchart illustrating a method of restoring application context to the mobile device after termination of communication between the mobile device and the in-vehicle information system.

DETAILED DESCRIPTION OF THE INVENTION

Figure 1:
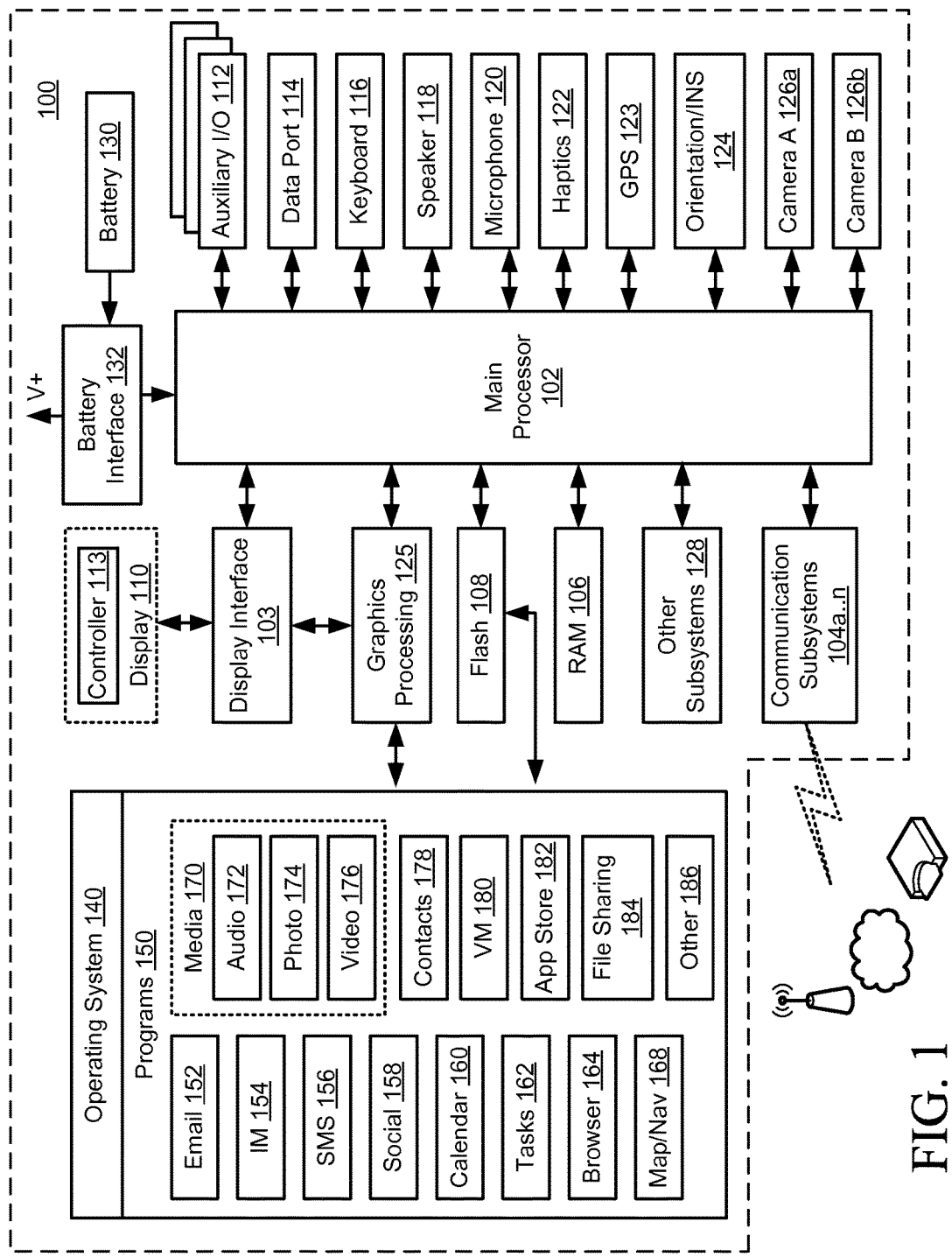
FIG. 1 is a block diagram of an example of a mobile device.

In-vehicle information systems can be connected with portable user devices (generally referred to herein as "mobile devices") to extend the functionality of the mobile device to the driver or other occupants of the vehicle (the user). The user may then access functions and data on the mobile device using the input/output (I/O) systems provided for the in-vehicle system, which can provide for effectively "hands free" use of the mobile device. A common example is the aforementioned provision of telephony services by a mobile phone: voice data is received by the mobile phone over a wireless network, and streamed to the in-vehicle information system for presentation using the vehicle's audio system; a vehicle microphone can pick up the driver's responses and transmit data to the mobile phone for encoding and transmission back over the wireless network. Another common example is the streaming of audio data (e.g. music, podcasts, audiobooks, and the like) from a mobile device for playback over the vehicle's speakers. Yet another example is the use of a map/navigation application executing on the mobile device, which can download map and navigation data over the wireless network, then transmit the map data and turn-by-turn navigation instructions to the in-vehicle information system for output via a display and/or speakers.

In such implementations, a fixed or wireless connection is typically established between the mobile device and the in-vehicle information system when the user of the mobile device brings the device into proximity with the vehicle; i.e., close enough so that the fixed or wireless contact can be made. Once the connection is made, a session is established between the mobile device and the in-vehicle information system to enable data exchange. For example, programs provided for the in-vehicle information system can be launched to access the device data. The user can then access data on the mobile device and interact with mobile device functions using the vehicle's I/O systems.

In the case of a mobile device that the user frequently carries on his person—for instance, a smartphone, tablet computer, or a personal entertainment device such as a MP3 player—a connection may therefore be established every time the user enters the vehicle with the device, and broken when the user leaves the vehicle with the device. However, the handoff between the mobile device and the in-vehicle information system is not seamless from a user operation perspective. The establishment of the connection with the in-vehicle information system may interrupt a currently executing function or application on the mobile device. In addition, once the connection is established, the user must engage with the vehicle's user interface to locate and activate the desired applications in order to access the mobile device data. Consider the situation where the mobile device is playing a music file at the time the connection with the in-vehicle information system is initiated; as a result of connection, music playback may be automatically halted, and applications executing on the mobile device may be terminated. Once the connection is established, to continue playback the user must then locate and launch the appropriate media player in the in-vehicle information system; the in-vehicle information system must retrieve media track listings from the mobile device; and then the user must select the appropriate track to recommence playback of the desired file.

Moreover, the operating system of the mobile device may limit the number of active screens (views, or graphical user interface displays) for a given application executing on the device: only a single application screen object may be configured to be in focus (i.e., capable of receiving user input events) at any given time, and other screen objects for the application, while they may be retained in memory, cannot be concurrently active and able to receive input events. This limitation, or other factors such as limited hardware resources on the device, may prevent the application from generating concurrent views that can be rendered and capable of receiving input concurrently on both the device's own display and via a vehicular display. Put another way, the execution environment on the mobile device may prevent a currently executing application from presenting a split "personality" across both the mobile device display and the vehicular display.

In short, while the user was operating the mobile device prior to connection with the in-vehicle information system, he was operating the mobile device in a specific operating context—activating specific views of different applications, selecting specific files for display or playback—but that context is lost due to the transition from the mobile device to the in-vehicle information system. The user must navigate a different user interface in the vehicle to establish a similar context within the in-vehicle information system. It is desirable to provide an effective means for the user to access specific applications and specific data of interest easily once the transition to the in-vehicle information system has been completed, which would reduce the consumption of processing resources for both the in-vehicle information system and the mobile device, and reduce the amount of time and attention a user must dedicate to operating the in-vehicle information system.

Accordingly, the embodiments and examples described herein provide a system, apparatus and methods for integrating mobile device operations with an in-vehicle information system in a manner that enables the context of various mobile device applications to be persisted from the mobile device to the in-vehicle information system, and vice versa.

These embodiments are described and illustrated primarily, on the one hand, in relation to mobile devices, and in relation to in-vehicle information systems on the other hand. Mobile devices include devices such as smartphones, tablet computers, and any other suitable portable user device as will be understood by those skilled in the art from the following description. It will be appreciated by those skilled in the art, however, that this description is not intended to limit the scope of the described embodiments to implementation on mobile or portable devices, or on smartphones or tablets in particular. For example, the methods and systems described herein may be applied to any appropriate communication device or data processing device, whether or not the device is adapted to communicate over a fixed or wireless connection, and whether or not provided with voice communication capabilities. The device may be additionally or alternatively adapted to process data and carry out operations on data in response to user commands for any number of purposes, including productivity and entertainment. Therefore, the examples described herein may be implemented in whole or in part on electronic devices including without limitation cellular phones, smartphones, wireless organizers, personal digital assistants, laptops, tablets, e-book readers, handheld wireless communication devices, notebook computers, portable gaming devices, portable devices equipped with location-based services, entertainment devices such as media players, and the like.

In the primary examples described herein, the mobile device includes an integrated touchscreen display; however, it will be readily understood by those skilled in the art that a touchscreen display is not necessary. In some cases, the electronic device may have an integrated display that is not touchscreen-enabled. In other cases, the electronic device (whether it possesses an integrated display or not) may be configured to output data to be painted to an external display unit such as an external monitor or panel, tablet, television screen, projector, or virtual retinal display (via a data port or transmitter, such as a Bluetooth® transceiver, USB port, HDMI port, DVI port, and the like). For such devices, references herein to a "display," "display screen" or "display interface" are intended to encompass both integrated and external display units unless otherwise indicated.

FIG. 1 is a block diagram of an example of a mobile device 100 that may be used with the embodiments described herein. It should be understood that components described in FIG. 1 can be optional and that a mobile device used with various embodiments described herein may include or omit components described in relation to FIG. 1. The mobile device 100 includes a number of components such as a main processor 102 that controls the device's overall operation. Additional processors or components can be included for functions not explicitly detailed herein, such as power management and conversion, encoding and decoding of audio and other data, and the like. Those skilled in the part will appreciate that such components, if present, are not illustrated here to simplify exposition.

The mobile device 100 may be a battery-powered device, having a battery interface 132 for receiving one or more batteries 130. Alternatively or additionally, the mobile device 100 may be provided with an external power supply (e.g., mains power, using a suitable adapter as necessary). If configured for communication functions, such as data or voice communications, one or more communication subsystems 104a . . . n in communication with the processor are included. Data received by the mobile device 100 can be received via one of these subsystems and decompressed and/or decrypted as necessary using techniques and components known to persons of skill in the art. The communication subsystems 104a . . . n typically include a receiver, transmitter, and associated components such as one or more embedded or internal antenna elements, local oscillators, and a digital signal processor in communication with the transmitter and receiver, and may optionally include software components typically provided as part of the device operating system.

The particular design of the communication subsystems 104a . . . n is dependent upon the communication network with which the subsystem is intended to operate. One or more of the communication subsystems 104a . . . n may be configured in accordance with one or more wireless communications standards for communication over wireless networks, typically operated by a wireless carrier and offering voice and/or data connectivity. Such wireless networks may be capable of supporting circuit switched and/or packet switched communications. New wireless communications standards are still being defined, but it is believed that they will have similarities to the network behaviour contemplated herein, and it will also be understood by persons skilled in the art that the embodiments described herein are intended to use any other suitable standards that are developed in the future. The wireless link illustrated in FIG. 1 can represent one or more different Radio Frequency (RF) channels, operating according to defined protocols specified for an appropriate wireless communications standard.

The communication subsystems 104a . . . n can include subsystems for other wireless communications, such as a wireless LAN (WLAN) communication subsystem. The WLAN communication subsystem may operate in accordance with a known network protocol such as one or more of the 802.11™ family of standards developed or maintained by IEEE. Various communications subsystems 104a . . . n can provide for communication between the mobile device 100 and different systems or devices without the use of the aforementioned wireless network, over varying distances that may be less than the distance over which the communication subsystem 104a can communicate with the wireless network. The subsystems 104a . . . n can include, in addition to one or more RF antennas and transceivers, an infrared device and associated circuits and/or other components for short-range or near-field communication.

It should be understood that integration of any of the communication subsystems 104a . . . n within the device chassis itself is optional. One or more of the communication subsystem may be provided by a dongle or other peripheral device (not shown) connected to the mobile device 100, either wirelessly or by a fixed connection (for example, by a USB port) to provide the mobile device 100 with wireless communication capabilities. If provided onboard the mobile device 100, the communication subsystems 104a . . . n may be separate from, or integrated with, each other as appropriate.

The main processor 102 also interacts with additional subsystems (if present), the general configuration and implementation of which will be known to those skilled in the art, such as a Random Access Memory (RAM) 106, a flash memory 108, a display interface 103 and optionally a display 110, other data and memory access interfaces such as a visualization (graphics) processor 125, auxiliary input/output systems 112, one or more data ports 114, a keyboard 116, speaker 118, microphone 120, haptics module 122 (e.g., a driver and a vibratory component, such as a motor), global positioning system (GPS) or other location tracking module 123, orientation and/or inertial navigation system (INS) module 124, one or more cameras, indicated at 126a and 126b and other subsystems 128. In some cases, zero, one or more of each of these various subsystems may be provided, and some subsystem functions may be provided by software, hardware, or a combination of both. For example, a physical keyboard 116 may not be provided integrated with the device 100; instead a virtual keyboard may be implemented for those devices 100 bearing touchscreens, using software components executing at the device. Additional display interfaces 103 or displays 110 may be provided, as well as additional dedicated processors besides the visualization processor 125 to execute computations that would otherwise be executed by the host processor 102. Additional memory or storage modules, not shown in FIG. 1, may also be provided for storing data, which can contain flash memory modules as well. Examples include removable non-volatile memory cards in appropriate formats and form factors. Such storage modules may communicate with the mobile device 100 using a fixed or wireless connection.

A visualization (graphics) processor or module 125 may be included in the mobile device 100. The visualization module 125 analyzes and processes data for presentation via the display interface 103 and display no. Data originally prepared for visualization on a large-screen display may require additional processing prior to visualization on a small-screen display. This additional processing may be accomplished by the visualization module 125. As will be appreciated by those of skill in the art, the visualization module can be implemented in hardware, software, or a combination thereof, and can include a dedicated image processor and associated circuitry, or can be implemented within main processor 102. Rendered data for painting to the display is provided to the display no (whether the display no is external to the device 100, or integrated) via the display interface 103.

Content that is rendered for display may be obtained from a document such as a message, word processor document, webpage, or similar file, which is either obtained from memory at the device such as flash memory 108 or RAM 106, or obtained over a network connection. A suitable application, such as a messaging application, viewer application, or browser application, or other suitable application, can process and render the document for display in accordance with any formatting or stylistic directives included with the document. FIG. 1 illustrates possible components of the device 100, such as the operating system 140 and programs 150, which can include zero, one or more applications such as those depicted. Other software components 186 besides those explicitly illustrated in FIG. 1 can also be included, as is well known to those skilled in the art. Some possible components are discussed in relation to FIG. 2 below. Programs 150 may be installed on the device 100 during its manufacture or together with loading of the operating system 140, or at a subsequent time once the device 100 is delivered to the user. These software applications may be supplied by the device manufacturer or operating system provider, or may be third party applications. The additional applications can be loaded onto the device 100 through at least one of the communications subsystems 104a . . . n, the data port 114, or any other suitable device subsystem 128.

Example applications include messaging applications such as email 152, instant messaging (IM) 154, and Short Message Service (SMS) 156. Other applications for messaging can be included as well, and multiple applications for each type of message format may be loaded onto the device 100. Other applications include social networking applications 158; calendar applications 160; task applications 162; browser applications 164; map/navigation applications 168, which may receive input location data from the GPS or other location technology subsystem 123, and retrieve, based on the location data, map and navigation data; media applications 170, which can include separate components for playback, recording and/or editing of audio files 172 (including playlists), photographs 174, and video files 176; contact applications 178; virtual machines 180, which when executing provide discrete runtime environments for other code on the device 100; "app store" applications 182 for accessing vendor sites offering software applications for download (and optionally for purchase) to the device 100; and direct or peer-to-peer file sharing or synchronization applications 184 for managing transfer of files between the device 100 and other devices. Applications may store data in the device's file system; however, a dedicated data store or data structure may be defined for each application.

If the mobile device 100 is adapted for multitasking, then more than one application may be launched and executed without a previously launched application being terminated, and consequently more than one application UI screen may be maintained in memory, and processes for more than one application may be executed by the processor 102. How multitasking is accomplished by the mobile device 100 varies according to the device's operating system and the device's processing and memory capabilities. Techniques for implementing multitasking and sharing resources among applications in mobile computing environments will be known to those skilled in the art. "Multitasking" applications have been described in mobile device contexts as including "true" multitasking, in which applications can execute unrestricted in the background, while another application or function is executing in the foreground; limited multitasking in which applications may register one or more threads with limited functionality and allocated resources to run in the background, while one application executing in the foreground is given priority in allocated resources over the applications running in the background; and simulated multitasking, in which execution of applications is suspended when their corresponding UI screen is not currently being displayed, but current state information for each application is maintained in memory for at least some period of time so that the application can resume in its current state when execution is resumed. Generally, when an application is executing in the foreground, a UI screen for that application is currently displayed on the device display 110, and that UI screen and application is considered to be in focus.

In some examples, the mobile device 100 may be a touchscreen-based device, in which the display 110 includes a touchscreen interface that provides both a display for visual presentation of data and graphical user interfaces, and an input subsystem for detecting user input via a graphical user interface presented on the display no that may be converted to instructions for execution by the device 100. In touchscreen embodiments, the display controller 113 and/or the processor 102 may detect a touch by any suitable contact member on the touch-sensitive display interface 110 (references to the "display 110" herein include a touchscreen display, for those electronic devices implemented with touchscreen interfaces). The construction and configuration of the touchscreen display and display controller for detecting touches will be known to those skilled in the art. Optionally, haptic or tactile feedback can be provided by the haptics module 122 in response to detected touches received through the touchscreen display, either through the housing of the device 100, or through the touchscreen itself.

The touchscreen sensors may be capable of detecting and supporting single-touch, multi-touch, or both single and multi-touch actions such as tap, double-tap, tap and hold, tap and drag, scroll, press, flick and pinch. Touches that are capable of being detected may be made by various contact objects, such as thumbs, fingers, appendages, styli, pens, pointers and the like, although the selection of the appropriate contact object and its construction will depend on the type of touchscreen implemented on the device. The touchscreen display 110 detects these single and multi-touch actions, for example through the generation of a signal or signals in response to a detected contact, which may then be processed by the processor 102 or by an additional processor or processors in the device 100 to determine attributes of the touch event, such as the location of the touch action, whether defined by horizontal and vertical screen position data or other position data. The detected touch actions may then be correlated both to user commands and to an element or elements displayed on the screen or view presented by the display 110. In response to the user command, the processor may take actions with respect to the identified element or elements.

A display no that is a touchscreen may be the principal user interface provided on the mobile device 100, in which case other user input mechanisms such as the keyboard 116 may not be present, although in some examples, a keyboard 116 and/or additional buttons, a trackpad or other user interface mechanisms may still be provided. References to the "display 110" herein include a touchscreen display, for those mobile devices implemented with such a touch interface.

Generally, user interface (UI) mechanisms may be implemented at the mobile device 100 as hardware, software, or a combination of both hardware and software. Graphical user interfaces (GUIs), mentioned above, are implemented using the display interface 103 and display 100 and corresponding software executed at the device. Touch UIs are implemented using a touch sensing mechanism, such as the aforementioned trackpad and/or touchscreen interface, along with appropriate software used to convert touch information to signals or instructions. A voice or speech UI can be implemented using the microphone 120, together with modules implemented in hardware or software operable to detect speech patterns or other sounds, and to decode or correlate detected sounds to user commands. Other possible UI mechanisms that may be provided include a tracking (e.g., eye-tracking or facial tracking) UI or perceptual UI implemented using the camera 126a and/or 126b, again with appropriate hardware and/or software modules to analyze received visual data to detect the presence or position of a user's face or eyes, which are used to derive commands or contextual information to control device operations; and a kinetic UI implemented using the device's orientation/INS module 124, or using the GPS module 123 or another locating technology module, together with appropriate software and/or hardware modules to detect the motion or position of the electronic device 100, again to derive commands or contextual information to control the device. Generally, the implementation of touch, voice, tracking/perceptual, and kinetic UIs will be understood by those skilled in the art.

The orientation/INS module 124 can include one or more motion or tilt sensors capable of detecting gravity- or motion-induced forces to determine physical conditions of the device such as acceleration and angular velocity, which in turn can be used to determine the orientation or geometric attitude of the mobile device 100, or changes thereto, in two or three dimensions. Motion sensors can include an accelerometer for detection of linear motion, and a gyroscope for detection of rotational motion. The selection and implementation of suitable motion sensors will be understood by those skilled in the art.

Figure 2:
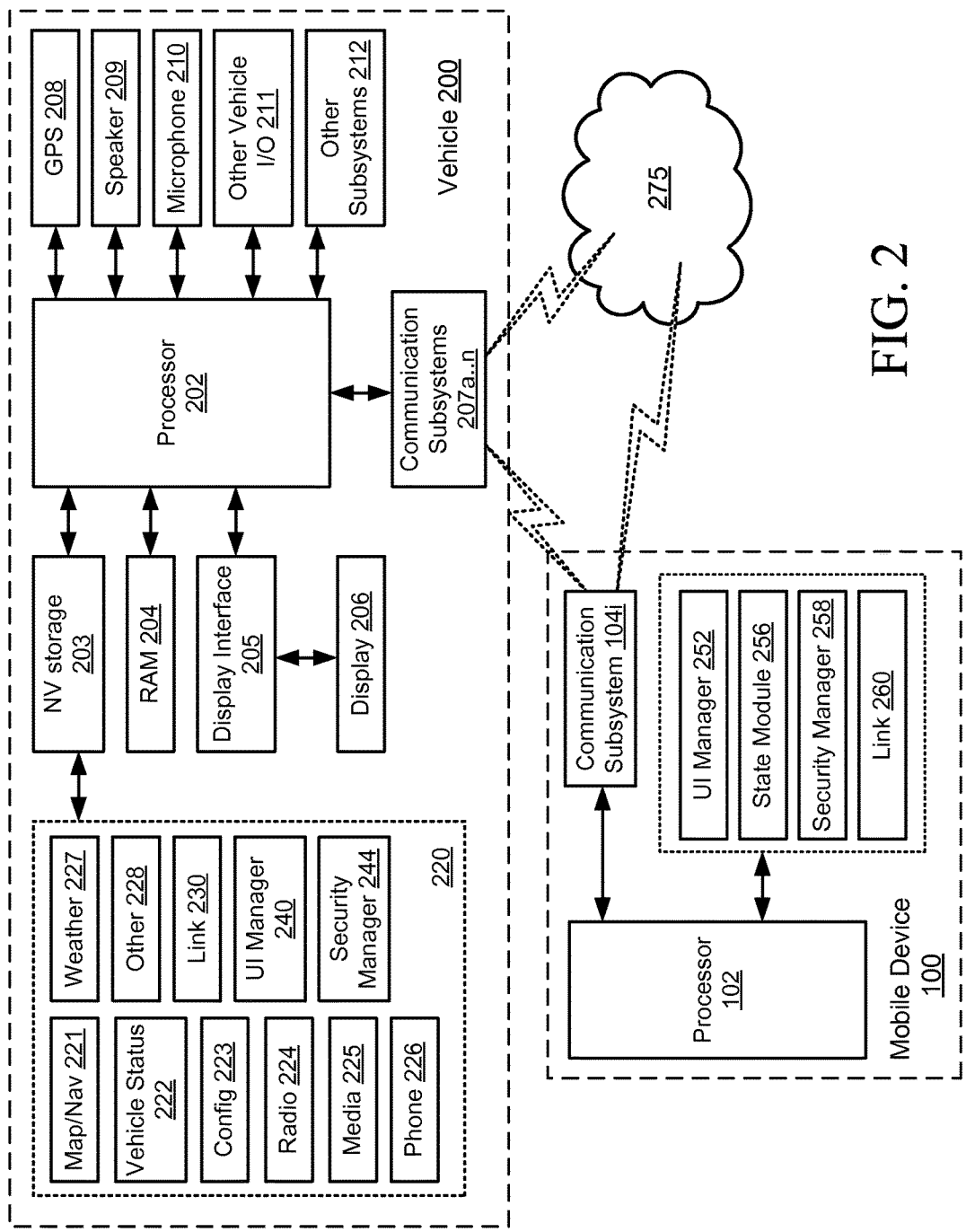
FIG. 2 is a block diagram of select components of an example in-vehicle information system and further select components of the mobile device of FIG. 1.

FIG. 2 is a block diagram illustrating select components of an example in-vehicle information system 200 for a vehicle (not shown) that may be used with the embodiments described herein. Again, it should be understood that components described in FIG. 2 can be optional and that an in-vehicle information system used with the various embodiments described herein may include or omit components described in relation to FIG. 2. Further, those skilled in the art will appreciate that other components may be included for functions not explicitly detailed herein, such as a power supply, environmental and engine sensors and controls, and the like. Such components are not illustrated to simplify exposition. The vehicle contemplated in these examples is a motor or road vehicle, since current models of such vehicles typically offer the type of in-vehicle information system that can be integrated with a mobile device 100 as described herein; however, it will be understood by those skilled in the art that the examples herein need not be limited to such types of vehicles, and can be extended to include off-road and other vehicles.

The in-vehicle information system 200 can include at least one processor 202 for controlling the in-vehicle information system's overall operation. Again, additional processors, not shown, can be included for performing functions which may or may not be described herein. The processor 202 interacts with various subsystems and components, the general configuration and implementation of which will be known to those skilled in the art. Non-volatile memory 203 may be used to store the operating system (not shown) and various programs 220 for execution by the processor 202. Temporary data may be stored in the volatile memory 204. Data processed by the processor 202 may be rendered (optionally by an additional graphics processor, not shown) for display via the display interface 205 for output to a display panel 206. The display panel 206 may comprise any suitable flat panel display technology, such as a liquid crystal display, and may be integrated into the vehicle interior, such as in the vehicle dashboard. In some examples, such as those described herein, the display panel 206 may comprise a touchscreen display, similar to that described for the mobile device 100, above. References to the "display panel 206" thus include touchscreen embodiments, but are not necessarily limited to touchscreen embodiments. In some cases the specifications and capabilities of the display panel 206 and the user interface views displayed by the display panel 206 may be limited or mandated by safety regulations or concerns, and those skilled in the art will understand how to modify the various examples described herein to comply with applicable legal requirements. For instance, it may be desirable to rely on single-touch user inputs on a vehicular touchscreen, since multi-touch and gesture inputs may require too much of the driver's attention to implement. Accordingly, it may not be necessary to provide a multi-touch capable display screen for the display panel 206.

The in-vehicle information system 200 is also provided with at least one communication subsystem 207*a* . . . n, which, like the communication subsystems 104*a* . . . n of the mobile device 100, can include subsystems for wireless communication over various distances, in accordance with one or more suitable protocols. In FIG. 2 a possible connection is shown to a wireless network represented by cloud 275. In some embodiments, the in-vehicle information system 200 may not be provisioned for communication over a wireless network like the mobile device; instead, an external device, not shown, may be connected with the in-vehicle information system 200 to provide this functionality. The external device may in some embodiments a dongle, as mentioned above, or may be the mobile device 100 itself. In the examples described herein, the in-vehicle information system 200 includes at least one communication subsystem suitable for communicating wirelessly with the mobile device 100 at least over a short distance. Suitable protocols can include one or more of the 802.11 standards or Bluetooth, but other protocols providing the necessary bandwidth and transmission speeds for the examples described herein may be used. As noted above, the mobile device 100 may be connected to the in-vehicle information system 200 over a fixed link. The in-vehicle information system 200 can therefore include one or more data ports in addition to, or in place of, the communication subsystems 207*a* . . . n.

Other components of the in-vehicle information system 200 can include a GPS system 208, speakers 209, microphone 210, other vehicle I/O systems 211 (which can include the aforementioned data ports), and other subsystems 212 generally. The in-vehicle information system 200 can also be provisioned with an operating system, as mentioned above, along with one or more programs or functions 220 such as a map/navigation program 221; a vehicle status program 222 for monitoring various environmental or operating conditions of the vehicle; a configuration program 223 for user configuration of system options; a radio program 224; media player 225; phone application 226; weather application 227, and other productivity, entertainment, or informational programs 228. In addition, in some examples described herein, the in-vehicle information system 200 is provided with a link program or component 230 which operates to provide integration with the mobile device 100. In addition, the in-vehicle information system 200 can include a UI manager component 240 for managing one or more "views", or screens, on the display panel 206. A "view", generally, comprises a graphical user interface (also referred to herein as a "screen"; e.g., an application UI view) that is presented to the user via a device or system display. The UI manager receives data for application UI screens or views to be displayed from one or more programs executing in the in-vehicle information system 200 or from the operating system, and provides data for a current view to be displayed to the display interface 205 for output to the display panel 206. Thus, the UI manager may receive application UI data and view data from the link program 230 while the link program 230 is executing. In addition, the in-vehicle information system 200 can include a security manager component 244 for implementing access control (e.g., password protection) over some or all of the functions of the in-vehicle information system 200.

One or more of the programs or functions mentioned above may be integrated into the operating system rather than provided as a standalone application. For instance, one or more of the UI manager 240, security manager 244, and link program 230 may be integrated into the operating system. In some examples, the link program 230 itself may be integrated into the operating system of the in-vehicle information system 200.

FIG. 2 also shows the in-vehicle information system 200 in communication with the mobile device 100 via a particular communication subsystem 104*i*, and select components of the mobile device 100. Like the in-vehicle information system 200, the mobile device 100 can include a counterpart link component 260 for managing sessions with the in-vehicle information system 200. The mobile device 100 may also include a UI manager component 252; a state module 256 for determining and persisting state information obtained for applications on the mobile device 100; and a security manager 258. The UI manager component 252 and security manager component 254 may provide similar functions to those described above with respect to the in-vehicle information system 200, and again, one or more of these components, as well as the link component 260, may be integrated into the device operating system 140. While the security manager component 258 may generally provide access control for the mobile device 100 (e.g., management of a device password for accessing data and functions on the device), it may also be configured to differentiate between sensitive data and non-sensitive stored on the mobile device 100. For instance, data stored on the device 100 may be associated with one or more categories of data. In one implementation, data and optionally applications may be assigned to either a "personal" category or a "work" category, where "work" data is considered to be sensitive or confidential (e.g. business-related data), and "personal" data is not. The security manager 258 associates a "work" user profile to sensitive data and optionally applications, and a "personal" user profile to other data and optionally applications, such that sensitive data can only be accessed while the "work" user profile is invoked on the mobile device 100. Invocation of a particular profile may involve selection of one or the other profile, and/or successful input of credentials associated with that profile. Sensitive data is thus restricted for use within a security perimeter defined by the "work" user profile, in that the data may only be accessed by permitted applications while that profile is in use. Similarly, "personal" data can also be restricted to its own perimeter defined by the "personal" user profile.

The state module 256 tracks and logs the state of applications executing on the mobile device 100, and in particular the state of specific applications that are executed in connection with the link component 260 and integrated with the in-vehicle information system 200. The state module 256 can detect and log status information for an application, including the application's current operating context, which can include the current operating state of an application (e.g., the level of priority the application has, whether it is executing in the foreground or background, etc.; the number of associated threads or processes) and the status of data and resource access by the application (e.g., what files it is currently accessing; whether it is currently streaming data or receiving data over a network; what application UI views are currently associated with the application, and which view was the last displayed for the application). In some examples, the state module 256 may listen for notifications issued by the operating system 140 and/or the application concerning changes in the application state. Some state information concerning application UI views may be maintained by the UI manager 252 instead.

Figure 3:
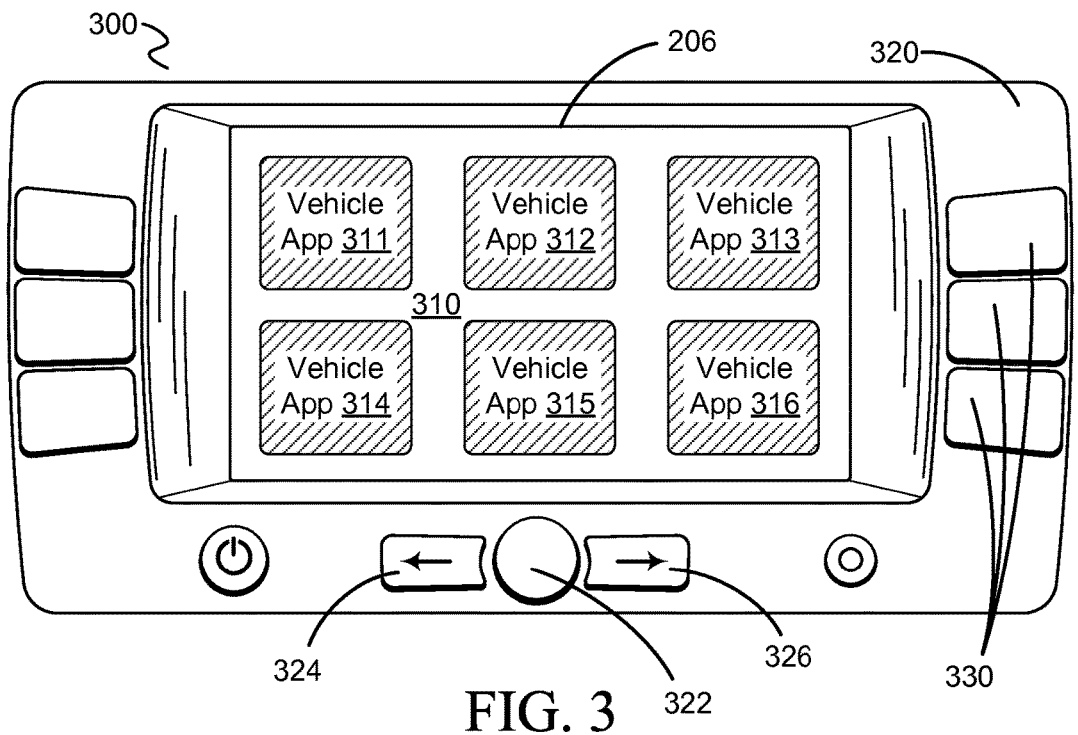
FIG. 3 is a diagram of a portion of a vehicle instrument panel with an embedded display panel.

The display panel 206 of the in-vehicle information system 200 can be integrated into the interior of the vehicle, for instance, mounted in the vehicle dashboard, within reach of the driver seat of the vehicle. FIG. 3 illustrates an example display panel 206 that is integrated into the vehicle interior in a vehicle instrument panel 300. The display panel 206 displays, in this example, a default UI view 310 for the in-vehicle information system 200. Here, a number of application UI elements (in these examples, icons) 311 to 316 representing various vehicle applications are displayed. The instrument panel 300 can include a number of physical input mechanisms such as buttons 330 which may be programmatically associated with specific applications or vehicle functions (e.g. radio station presets, media player, volume control, track selection, and so on). Other input mechanisms may be provided for onscreen navigation, such as rotary control 322 and forward/back buttons 326, 324. These physical mechanisms are optional in the case where the display panel 206 is a touchscreen display. In the case where the rotary control 322 or forward/back buttons 326, 324 are used to select UI elements displayed on screen, navigation among the UI elements is essentially linear, whereas the UI elements may be arrayed in a two-dimensional layout; accordingly, in the various examples described herein, a navigation order may be assigned to the various elements to ensure that each element is selectable using the rotary control or buttons. Techniques for adapting user interfaces for navigation by the input mechanisms mentioned herein will be known to those skilled in the art. In the various examples described below, the display panel 206 is a touchscreen display unless otherwise indicated; however, it should be understood that these examples are not necessarily limited to touchscreen implementations.

In other examples, the display panel 206 or even an ancillary display panel (not shown in the figures) may be provided for passenger use, and could therefore be mounted elsewhere in the interior, such as on the passenger side of the dashboard or in a seatback or headrest. Still further, the display panel 206 may not be integrated into the vehicle interior at all, but may be provided as an external unit to be mounted on the vehicle interior. In that case, the display interface 205 shown in FIG. 2 is integrated into the in-vehicle information system 200, and communicates over an appropriate fixed or wireless with the display panel 206. As with the mobile device 100, references to the "display panel" or "display" of the in-vehicle information system 200 encompass both integrated and external display units unless otherwise indicated.

Figure 4:
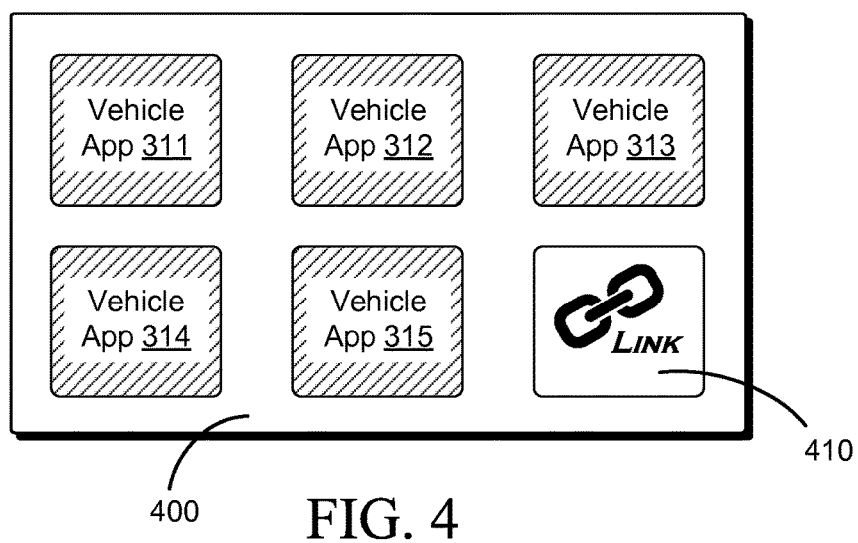
FIG. 4 is a schematic diagram of an example user interface view for the in-vehicle information system of FIG. 2.

As indicated above with reference to FIG. 2, the in-vehicle information system 200 includes a link program 230. FIG. 4 depicts an alternate default view 400 for the in-vehicle information system 200, in which one of the icons 410 comprises an icon for the link program 230. Actuation of the icon 410, for example by a touch (in the case of a touch screen) or selection using a physical input mechanism, launches the link program 230. The link program 230 may initiate a wireless connection with the mobile device 100, although in some implementations, the connection is already established before the link program 230 is launched. For example, when the mobile device 100 is initially brought within proximity of the in-vehicle information system 200, a wireless pairing or connection may be manually established between the device 100 and the system 200. Depending on the configuration of the device 100 and system 200, subsequent pairings or connections may be automatically established whenever the device 100 and system 200 are in close enough proximity.

The link program 230 then establishes a link or session with the mobile device 100 for the transfer of application and context data between the mobile device 100 and the in-vehicle information system 200, and may directly manage the display of user interface screens on the display panel 206, optionally in conjunction with the user interface manager 240. In these examples, the link between the mobile device 100 and the in-vehicle information system 200 provides for the integration of select mobile device applications and functions with the in-vehicle information system's I/O systems. The select applications and functions can include one or more of a telephone function and optionally a contacts application 178; a map/navigation application 168; a media player application 170; and a calendar application 160. Other applications or functions of the mobile device 100 may be included in the integration; however, the aforementioned applications are selected for description herein because they relate to communication, travel, and entertainment activities that the user may engage in while travelling by vehicle.

At the time the session with the in-vehicle information system 200 is established, one or more of these applications may already be executing on the mobile device 100, whether in the foreground or in a lower priority background state. On the other hand, some or all of these applications may not be executing at the time the session starts. The link component 260 can invoke any of the specified applications that are not currently executing to ensure they are available to process any requests that are received via the vehicle UI and directed to the mobile device 100. Once the session is established, however, the applications may no longer be accessible to the user on the mobile device 100 for the duration of the session. For example, the device 100 may enter a locked state to prevent the user from accessing the applications directly on the device 100, although an option may be provided to the user on the mobile device 100 to terminate the session and/or sever the link with the in-vehicle information system 200.

Figure 5A:
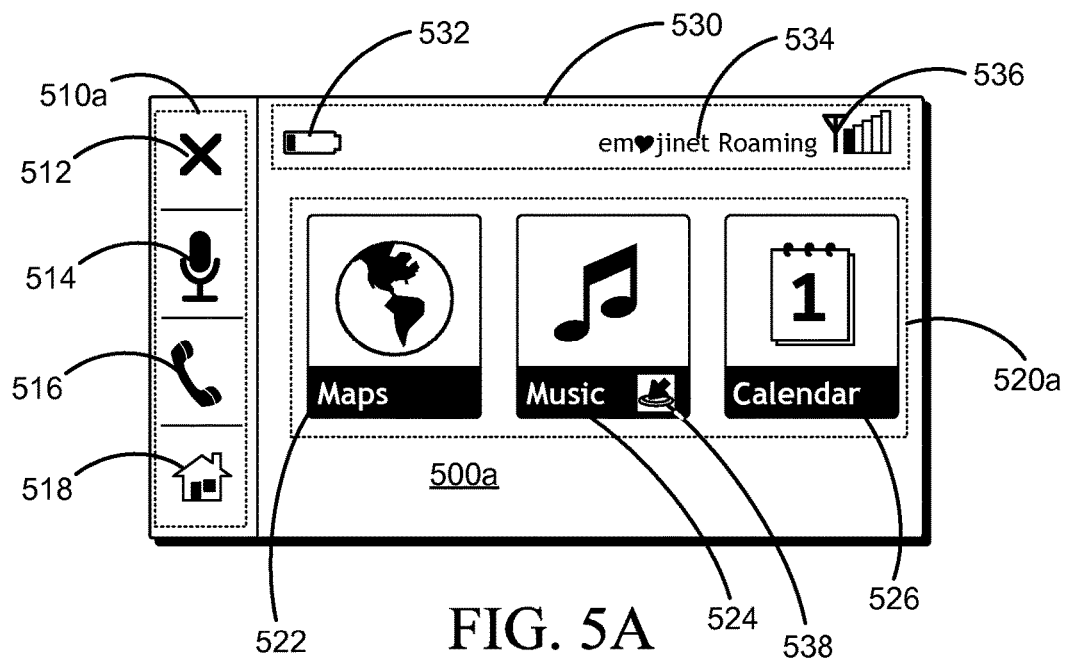
FIGS. 5A to 5C are schematic diagrams of further example user interface views for the in-vehicle information system of FIG. 2 while connected to the mobile device of FIG. 1.

Turning to FIG. 5A, when the link between the mobile device 100 and the in-vehicle information system 200 is established, a landing view, "launch me", or "homescreen" UI view may be displayed on the display panel 206. The example view in FIG. 5A is a default homescreen view, comprising a default configuration of application UI elements and other UI elements. The homescreen view provides UI access in the vehicle to the select applications or functions of the mobile device 100. The homescreen view may be generated by the link component 260 and transmitted via the connection to the in-vehicle information system 200 (e.g., to the link program 230) for display. Similarly, application-specific UI views for the various applications executing on the mobile device 100 may be generated by the link component 260 based on context data and associated application data obtained from each corresponding application, and sent to the system 200 for display. Otherwise, application-specific UI views suitable for in-vehicle display are generated by each application and provided to the link component 260. In either of these variations, the in-vehicle information system 200 effectively "mirrors" the UI views generated at the mobile device 100, although the UI views that are provided by the device 100 may in fact vary from the UI views that are generated at the device 100 for display via the device's own display screen no. In these variations, each application thus presents an alternative "personality" or view according to which hardware component—either the display of the device 100, or the vehicular display—is displaying the application view that will be in focus and capable of receiving user input. Alternatively, the link component 260 provides sufficient application context information and associated data for each of the selected applications to the link program 230 to generate the various application UI elements described below. The UI views are then generated by the link program 230 executing in the in-vehicle information system 200. Either alternative may be employed in the examples described herein. In any case, however, contextual information and other application data necessary for generation of the various UI views are provided by the mobile device 100. This data can include data for invoking or requesting certain application UI views or application functions that may be relevant to the view (e.g. pre-formatted request strings, application entry point identifiers, etc.) and file metadata relating to the current operating context of the application (e.g., file, event or location identifier; track name, artist, cover art graphics, etc. for a media file; starting and end times, participants, location/call number, subject, etc. for a calendar event; street address, location name, etc. for a destination).

Given the difference in display form factor and possibly in display capabilities between the mobile device 100 and the system 200, the homescreen and application UI views as they may be displayed on the mobile device 100 do not necessarily translate directly to the display panel 206, and indeed, it may not be desirable for a homescreen or application UI view to appear on the display panel 206 exactly as it appears on the display 110 of the mobile device 100. As mentioned above, there may be regulatory constraints on the operation of the display panel 206. There may also be regulatory constraints on the content displayed, such as minimum text size or restrictions on animations or video. Accordingly, the views displayed on the display panel 206 for the select applications and functions will likely differ from the views normally displayed on the mobile device 100 for the same applications and functions.

As explained in further detail below, display of the homescreen view is dependent on context information provided by the mobile device 100 concerning the various applications represented in the homescreen view. If context information is available, then homescreen may be modified from the default view 500a, such that UI elements included in the view are adapted to reflect the context information. Also, depending on the available context data, upon the link being established between the mobile device 100 and the system 200, the homescreen view 500a can be bypassed in favor of a particular application UI view. In a case where no context information is available, the default view 500a is displayed.

The default homescreen view 500a illustrated in FIG. 5A includes UI features that may be present in all homescreen views regardless of the context information provided by the mobile device 100. The default homescreen view 500a can also include UI features that are responsive to the context information obtained from the device 100. The dock region 510a, for instance, may be persisted across all variants of the homescreen view. The dock region 510a includes UI elements 512, 514, 516, 518 representing application entry points for various in-vehicle information system 200 or mobile device 100 functions that are commonly used, such as a back/close action 512 for exiting the link application 230 (and terminating the session) and returning to the default view for the in-vehicle information system 200; a voice control application 514, which when activated enables the user to issue voice commands to the in-vehicle information system 200; phone function 516, which may make use of either the mobile device 100's phone function, or an on-board phone function provided on the in-vehicle information system 200; and a home button 518 for returning to a designated landing screen (which may be the homescreen 500a). In some examples, the dock may provide access to other types of applications for which direct access is desired from any screen displayed on the vehicle display panel 206. Other functions that would be suitably represented by UI elements in the dock region 510a will be known to those in the art.

The default homescreen 500a also includes an application UI element region 520a, comprising application UI elements associated with application entry points for the select applications mentioned above, such as a map/navigation UI element 522, media player UI element 524, and calendar UI element 526. In the default homescreen view 500a where no context is provided by the mobile device 100, the application UI elements 522, 524, 526 are presented in a default state, and actuating one of these default state application UI elements 522, 524, 526 invokes a default fullscreen view of the respective application.

As is conventional in the art, these various UI elements are icons, i.e., elements frequently of a pictorial nature, optionally displayed with accompanying text. Each of the UI elements is associated with an entry point for a corresponding application or function. Actuation of a UI element displayed on the display panel 206, such as an application UI element 522 (e.g., by "tapping" on the element when displayed on a touchscreen, or otherwise invoking a user interface event associated with the element using another user input mechanism), results in invocation of the corresponding application or function, and presentation of a UI view for that application on the display panel 206. The UI view that is presented depends on the entry point identified by the UI element. Actuation of the element may also be variously referred to as activating the UI element; "clicking" or "tapping" the UI element (which refers to generic user input actions that are commonly used to select a UI element for actuation); invoking the UI element; or invoking or launching the UI element's corresponding application or function via the displayed view. In these examples, when the UI views that are displayed by the in-vehicle information system 200 are provided by the mobile device 100, actuation of UI elements at the system 200 are detected by the link program 230, and interpreted as requests for application views and/or data from the mobile device 100. The link program 230 accordingly issues a corresponding request to the mobile device 100 over the wireless connection. The mobile device 100 generates the requested UI view data in accordance with the examples described herein, and transmits the generated data to the link program 230 in response. If the UI views that are displayed by the system 200 are generated by the link program 230 at the system 200, then the mobile device 100 transmits sufficient UI and context data for the link program 230 to be able to generate the required UI views in accordance with the examples described herein.

All homescreen views can include zero, one or more status indicators 532 to 538 when a triggering event occurs. Status display region 530 in FIG. 5A illustrates three possible status indicators each reflecting a status of the mobile device 100, such as a battery level indicator 532, visually indicating a level of charge remaining on the mobile device 100 battery; a wireless network carrier indicator 534, indicating whether the mobile device 100 is currently roaming, and the carrier to which it is currently connected; and a wireless network signal strength indicator 536. In FIG. 5A, all three indicators are shown at once for illustration purposes, and in some examples these indicators may always be displayed on the homescreen view; however, to minimize clutter in the view and to reduce the amount of distracting information displayed to the user, these indicators are only displayed on a "need to know" basis, such as when a triggering event occurs at the mobile device 100. Thus, the battery indicator 532 is displayed only in response to a detection that the remaining battery charge has dropped below a predetermined threshold. The wireless network carrier indicator 534 may be displayed only in response to detection that the mobile device 100 has exited its home location and is now roaming. The signal strength indicator 536, as well, may only be displayed when the detected signal strength drops below a predetermined threshold. These indicators 532, 534, 536 may persist on the homescreen view 500a (and other homescreen views) so long as the triggering condition persists, and so long as the mobile device 100 remains connected to the in-vehicle information system 200. The triggering events and status indicators here indicate sensor or operational conditions of the mobile device 100, rather than of the vehicle or in-vehicle information system 200. Other status indicators that may be suitable for the status region 530 will be known to those skilled in the art.

Other indicators may be displayed in the status region 530 or elsewhere in the view. An example is the buffering indicator 538, which indicates that the in-vehicle information system 200 is engaged in loading data (e.g., media files or map data) from the mobile device 100. The buffering indicator 538 would be displayed only when buffering is taking place, to indicate to the user that the connection between the in-vehicle information system 200 and the mobile device 100 is still operational during the buffering. The indicator 538 may be displayed proximate to the application UI element corresponding to the buffering application, rather than in the status region 530. Thus, in FIG. 5A, the buffering indicator 538 is displayed with the media player UI element 524.

Figure 5B:
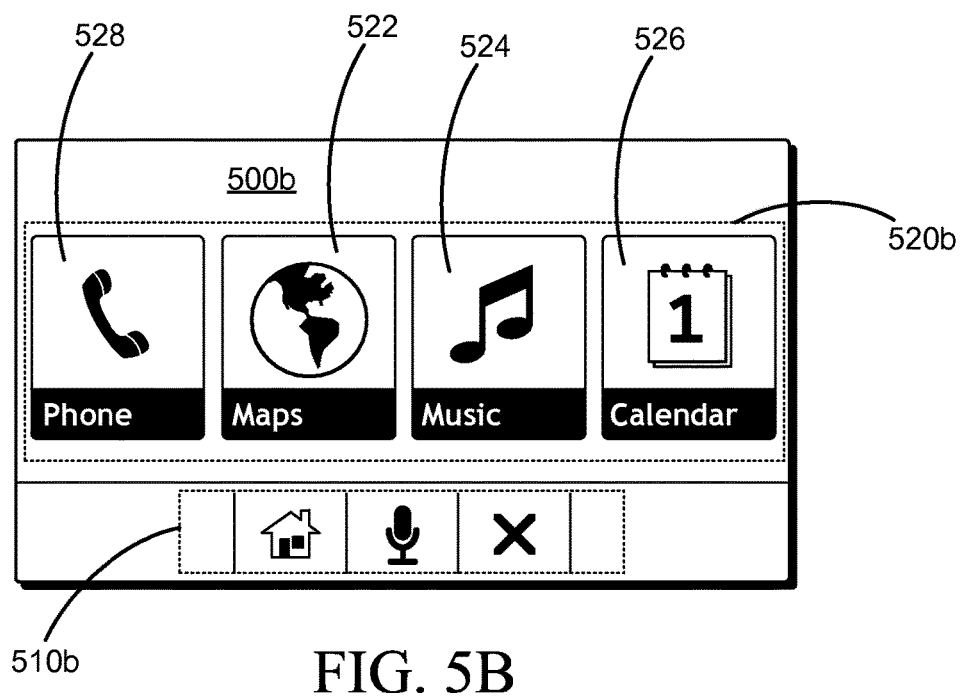

FIG. 5B illustrates an alternate view 500b of the default homescreen. Generally, it will be appreciated by those skilled in the art that the layout of these homescreen views 500a, 500b as well as the other views illustrated herein may be varied while remaining within the scope of the embodiments described herein. FIG. 5B illustrates an example where the dock region 510b has been repositioned, and the application UI element area 520b now includes a further application UI element 528 representing the phone function, which is therefore removed from the dock 510b.

As stated above, the display of the homescreen view 500a (or a variant of the homescreen view) is dependent on context information at the mobile device 100 at the time the link application 230 is launched. Context information, generally, is obtained from at least the current execution state of each relevant application. In the example of FIG. 5A, this would include the map/navigation application 168, media player 170, and calendar application 160. In the example of FIG. 5B, this can further include the phone function, and optionally the contacts application 178.

Figure 5C:
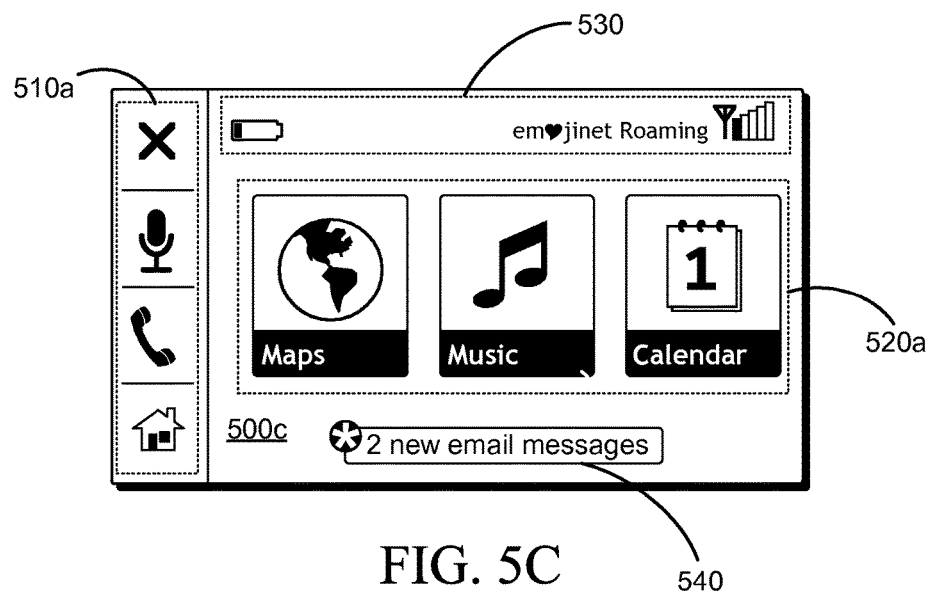

FIG. 5C illustrates a further example in homescreen 500c that may be implemented with any variant of the homescreen, or with any other view presented on the display panel 206 mentioned herein. Select events detected by the device 100 or the in-vehicle information system 200, such as calendar events, reminders, receipt of new messages, detected environmental or operating conditions of the vehicle or changes thereto, and so on, can trigger a visual notification displayed on the display panel 206, for instance in the form of a "toast" or informational notification 540 that is temporarily displayed onscreen. The informational notification may be actuatable by the user, for instance by a touch event, to invoke an application or further informational display relating to the substance of the notification 540. The content of the notification 540 may comprise only an informational notice indicating the type of event that has occurred, or may include some form of preview of the event; for example, where the event is receipt of a new message or the start of a calendar event, the notification 540 may include content extracted from the body of the received message or a subject extracted from the calendar event. The appearance of this notification 540 may be subject to regulatory requirements, and it may be configurable according to user preferences (e.g., its appearance may be suppressed while the vehicle is in motion, suppressed altogether, or it may be configured to appear only for certain types of events).

In a simple embodiment, context information for an application is available when the application is currently executing on the device 100, and not available when the application is not currently executing. The context information can include current execution state data for the application, such as the priority accorded by the device operating system 140 to the executing application (e.g., whether it was executing in the foreground or the background, and/or whether its application UI view is currently displayed on the mobile device display 110); the last application UI view displayed for the application on the mobile device 100; and the current output state of the application. An application can be considered to be actively updating output information or outputting dynamic data when it is streaming or playing media or voice data (e.g., when a media player is playing back an audio file, or the device 100 is handling a voice call), or updating output data in response to detected changes to the device (e.g., updating navigation instructions and map data in response to detected changes to the mobile device's position). In this example, the current executing state and the current output state of each application determine (1) whether an operating context exists at the mobile device 100 that is to be persisted to the UI views displayed by the in-vehicle information system 200; and (2) how the operating context is to be persisted on the system display 206. For example, it may be determined that context for an application should be persisted to the system 200 when the application was executing in the foreground and/or was outputting dynamic data at the time the link was established.

Thus, if at the time the link is established between the system 200 and the mobile device 100, one of the relevant applications on the mobile device (map/navigation application 168, media player 170, calendar application 160, phone/contacts application 178) is currently executing on the mobile device 100 in the foreground and its current output state indicates that it is actively streaming or updating output data via one or more output interfaces of the mobile device (e.g. playing an audio file, displaying turn-by-turn navigation instructions based on downloaded map and navigation data, or handling an ongoing voice call), then an application UI view for that application is automatically presented on the display panel 206 in place of the default homescreen view 500a or 500b, and the output data is automatically streamed to the in-vehicle information system 200 for output using the vehicle's output subsystems (e.g., speakers and/or display panel 206).

If, at the time the link is established, an application is currently executing in the background and its current output state indicates that it is actively playing or updating output data, then the homescreen view may be displayed provided the homescreen view is not pre-empted by an application UI view for another application. If the homescreen view is displayed, it is modified to provide a visual indication of the current context of that application. The modification can comprise display of an alternate application UI element for that application. Again, the output data may be automatically transmitted to the in-vehicle information system 200 for output via the vehicle's output subsystems in place of the mobile device's output subsystems.

If the application was executing in the foreground and was only presenting static information (as opposed to "dynamic" data), then there is no need to stream or transmit updated output data to the in-vehicle information system 200; however, because the application was executing in the foreground on the mobile device 100, in this example there is context information that can be presented in the homescreen view. If the application was executing in the background but was only presenting static information, or was not executing at all at the time the link is established, then in this example no context information is to be persisted to the in-vehicle information system 200, and the link component 260 would therefore provide the system 200 with the default application UI element for the application in the homescreen view.

This is summarized in Table 1 below, and illustrated schematically in FIGS. 6A to 6D:

TABLE 1

| Current Execution State (Mobile) | Current Output State (Mobile) | Output Response (Vehicle) |
| --- | --- | --- |
| foreground | active | bypass homescreen and show application UI for current output (for graphic output) show homescreen and indicate current application context (for audio output) transmit output data to vehicle for output via vehicle output subsystem |
| background | active | if homescreen not pre-empted, show homescreen and indicate current application context transmit output data to vehicle for output via vehicle output subsystem |
| foreground | static | if homescreen not pre-empted, show homescreen and indicate current application context |
| background | static | if homescreen not pre-empted, show homescreen with default UI element for application |
| not executing | not applicable | if homescreen not pre-empted, show homescreen with default UI element for application |

The "current" execution state and output state in Table 1 reflects the state of each application at the time the link program 230 is launched or the link is established between the mobile device 100 and the system 200, since as noted above, the link component 260 on the mobile device may launch any non-executing applications. The current execution state and output state represent the most recent user-invoked context for the application on the mobile device 100; or in other words, the state in which the user had left the mobile device 100 at the time the link with the in-vehicle information system 200 was established. If the user had been playing music on the mobile device 100 at the time the link was established, the relevant application context for the media player 170 on the device 100 would be that the application was currently executing (in either the foreground or background), and actively outputting data to the user. As described above, this information may be collected by the state module 256.

Figure 6A:
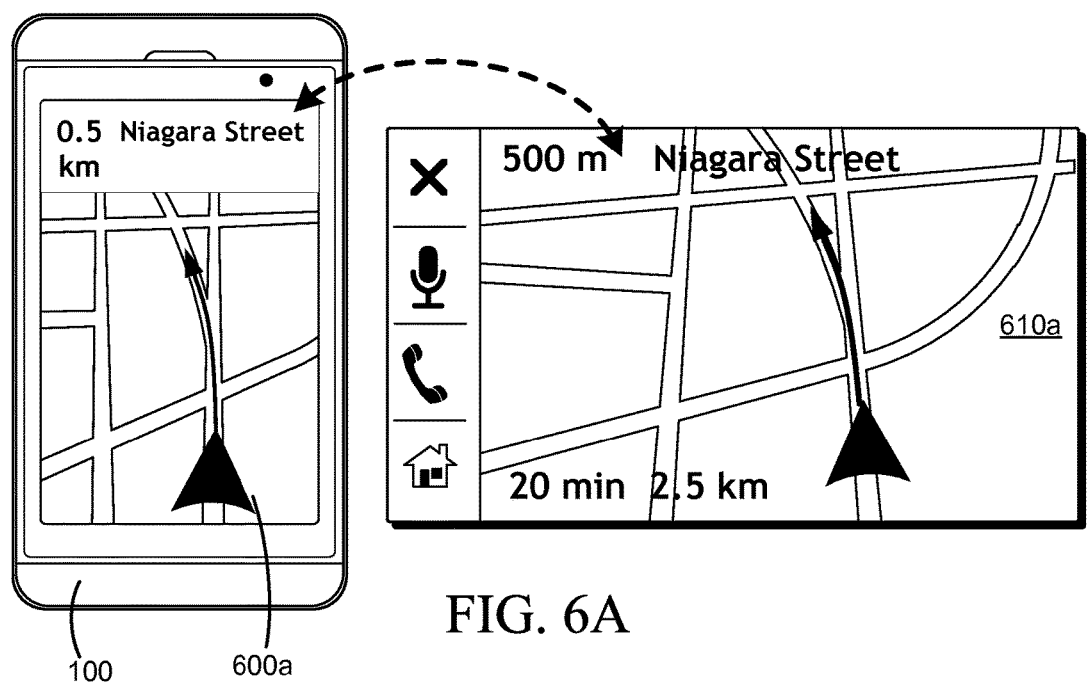
FIGS. 6A to 6E are schematic diagrams of example user interface views that can be displayed by the in-vehicle information system in response to a determined state of the mobile device.

Using this context information, the link component 260 and/or application determines the form of UI view and application data that is to be delivered to the counterpart link application 230 for display by the in-vehicle information system 200. FIG. 6A illustrates the first set of conditions in Table 1, in which an application is executing in the foreground and is actively outputting data to the user. It will be noted that in the following figures, some UI elements depicted in FIGS. 5A and 5B have been omitted for clarity of presentation. In this example, the map/navigation application 168 was executing in the foreground on the mobile device 100 at the time the link was established, and was actively displaying turn-by-turn navigation instructions and map data to the user in an application UI view 600a. Accordingly, it is determined that the homescreen view should be bypassed, and an application UI view for the map/navigation application is provided to the in-vehicle information system 200 for display.

In this example, the application UI view 610a for the vehicle comprises the turn-by-turn navigation view, although as noted above, the view constructed for the vehicle display 206 can differ from the view of the same data originally displayed on the mobile device 100. In addition, as the map and navigation data is updated by the map/navigation application 168 executing on the mobile device 100 in response to detected changes in the mobile device 100 location (e.g., using the GPS subsystem 123), the link component 260 obtains the map and navigation data received by the map/navigation application 168, and sends this information in updated UI views to the link application 230 for use in updating the displayed view on the vehicle. The operating context on the mobile device 100 is thereby persisted visually and functionally to the in-vehicle information system 200: at the time of the link, the mobile device 100 was displaying and updating navigation instructions and map data, and upon establishment of the link, the in-vehicle information system 200 continues to display the same information. Accordingly, the operating context of the mobile device 100 has not been lost as a result of the integration with the system 200.

In a variant of this example, not illustrated, prior to the link being established, the map/navigation application 168 may have been presenting navigation instructions to the user for a first transport modality—for instance, directions for travelling on foot, bicycle or by public transit. Once the link is established and the application UI view is generated for the in-vehicle information system 200, the transport modality for the map/navigation application 168 is automatically changed to driving, and the navigation instructions are switched to driving directions, since the mobile device 100 is now of course present in a vehicle.

Figure 6B:
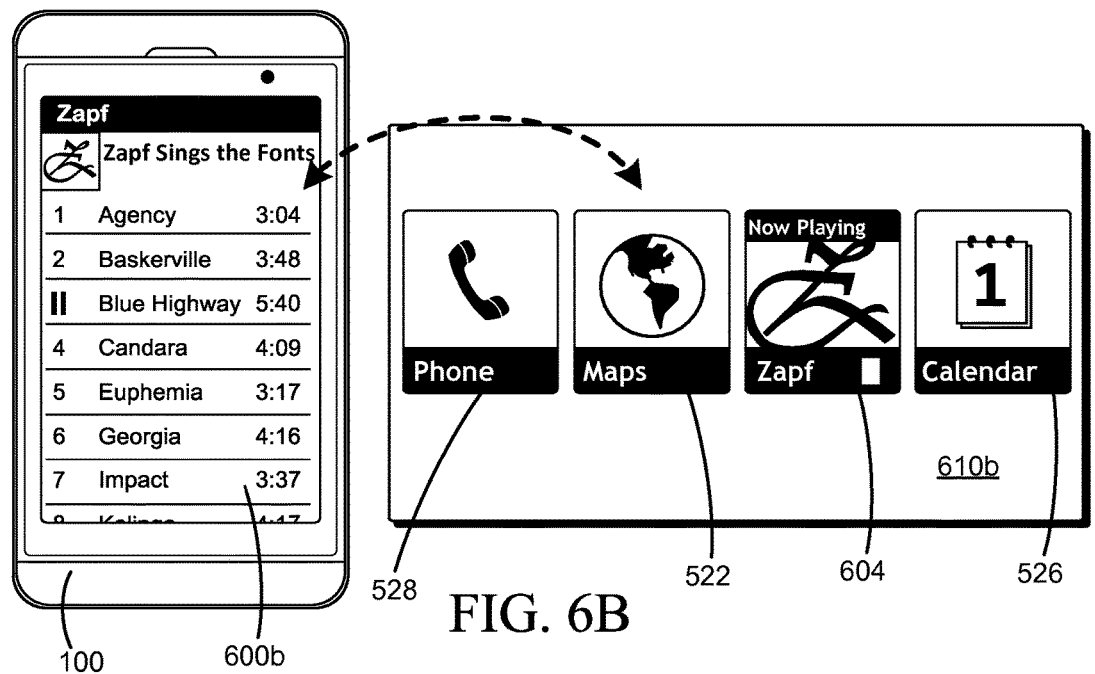

FIG. 6B illustrates the case where an application was executing in the background and was actively outputting data at the time the link was established. This may be the case where the media player application 170 was executing in the background and playing back an audio file, as mentioned above. The UI view 600b illustrates a possible view that could have been displayed on the mobile device 100; given that the media player 170 was executing in the background, its corresponding UI view would not have been displayed on screen. In this case, a homescreen view 610b is generated and provided to the in-vehicle information system 200. The homescreen view 610b can include the standard set of application UI elements 522, 526, 528; however, in this example, the application UI element corresponding to the media player application 170 has been replaced with a modified UI element 604 that provides a visual indication of the operating context for the application 170: the element 604 in this example includes graphics and text representing the audio file currently being played back, as well as a further UI element that may be actuated to control the playback of the audio file. The functions associated with modified application UI elements are discussed below with reference to another embodiment.

At the same time, to preserve the operating context of the mobile device 100, which was playing the audio file at the time the link was established with the in-vehicle information system 200, the link component 260 can stream the audio data to the in-vehicle information system 200 for output via the vehicle's speaker system.

Figure 6C:
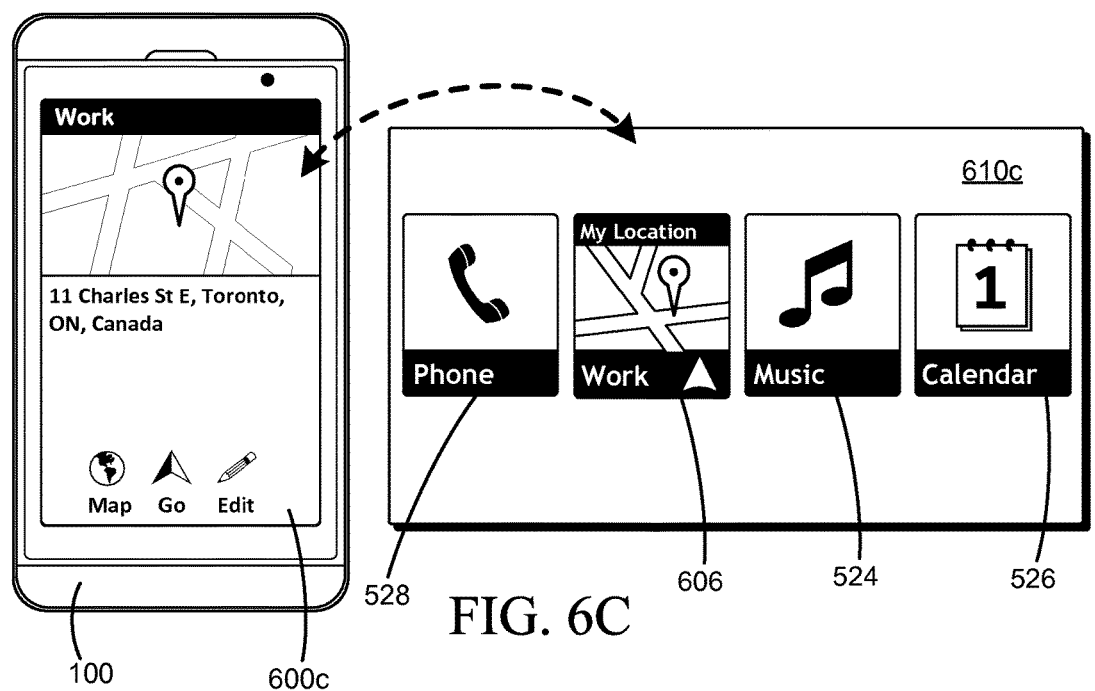

FIG. 6C illustrates the case where an application was executing in the foreground at the time the link was established, but was merely displaying static data to the user, as shown in the example mobile device application UI view 600c. In this example, the data presented by the map/navigation application 168 comprises location details for a selected destination. Accordingly, there is no dynamic application data to stream to the in-vehicle information system 200 as in the case with the executing media application 170. However, because the map/navigation application 168 was executing in the foreground, its operating context is persisted to the in-vehicle information system 200 in the homescreen view 610c by modifying the default homescreen view to include a modified map/navigation UI element 606 that provides a visual indication of the operating context of the application on the mobile device 100.

Figure 6D:
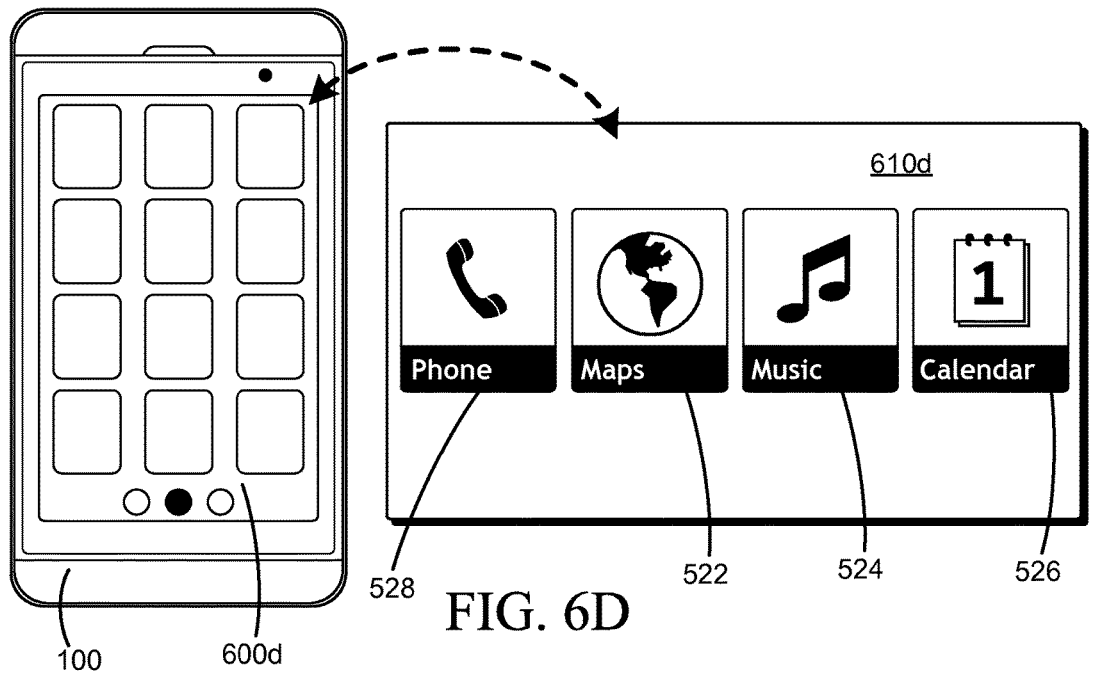

FIG. 6D illustrates the case where an application was not executing at the time the link was established. An example mobile device homescreen view Good is shown here, although many other views (including views of another application that was currently executing) may be shown instead. Since there is no operating context information to persist to the in-vehicle information system 200, the default homescreen view 610d is provided to the system 200.

It can be seen from the foregoing discussion that when a session between the mobile device 100 and the in-vehicle information system 200 is invoked, the relevant context of the mobile device 100 is automatically persisted in the graphical user interface displayed by the in-vehicle information system 200. It will be appreciated by those skilled in the art that the individual examples of FIGS. 6B through 6D can be combined; for instance, at the time the link was established between the in-vehicle information system 200 and the mobile device 100, the map/navigation application 168 may have been executing in the foreground and displaying static data, while the media player 170 was executing in the background and playing an audio file. In that case, the homescreen view may be modified to include a modified application UI element for both the map/navigation and media player applications. Furthermore, if the mobile device 100 is capable of transmitting multiple data streams (e.g. updated map/navigation data and audio data), the examples of FIGS. 6A and 6B may be combined. If the mobile device 100 is not capable of concurrently transmitting both types of data to the in-vehicle information system 200, then the data stream for the background-executing application could be terminated in favor of the foreground-executing application.

Figure 6E:
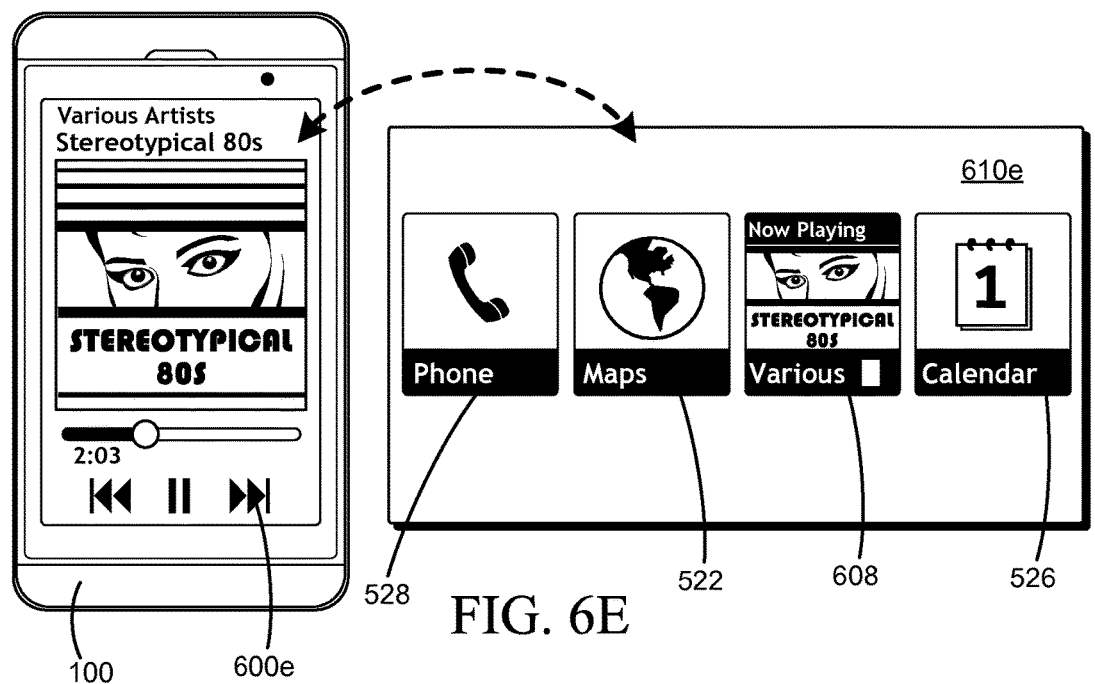

In a variant of this example, only certain classes or types of applications are accorded priority on the in-vehicle information system display panel 206 when they are executing in the foreground and outputting dynamic data. For instance, if the media player application 170 is executing in the foreground on the mobile device 100, as illustrated in mobile device view 600e of FIG. 6E, and playing an audio file when the link application 230 establishes a session with the mobile device, the mobile device 100 may stream the audio file to the in-vehicle information system 200 for playback, but will not pre-empt the display of the homescreen view since a visual display is not necessary for playback of the audio file. Instead, a modified homescreen view 610e is displayed with a media player UI element 608 indicating the context of the media player application. On the other hand, if the map/navigation application 168 is executing in the foreground on the mobile device 100 and displaying dynamic data at the time the session is established, the map/navigation UI screen would pre-empt the display of the homescreen view as shown in FIG. 6A, since the display screen 206 is required for presentation of map data.

Figure 7:
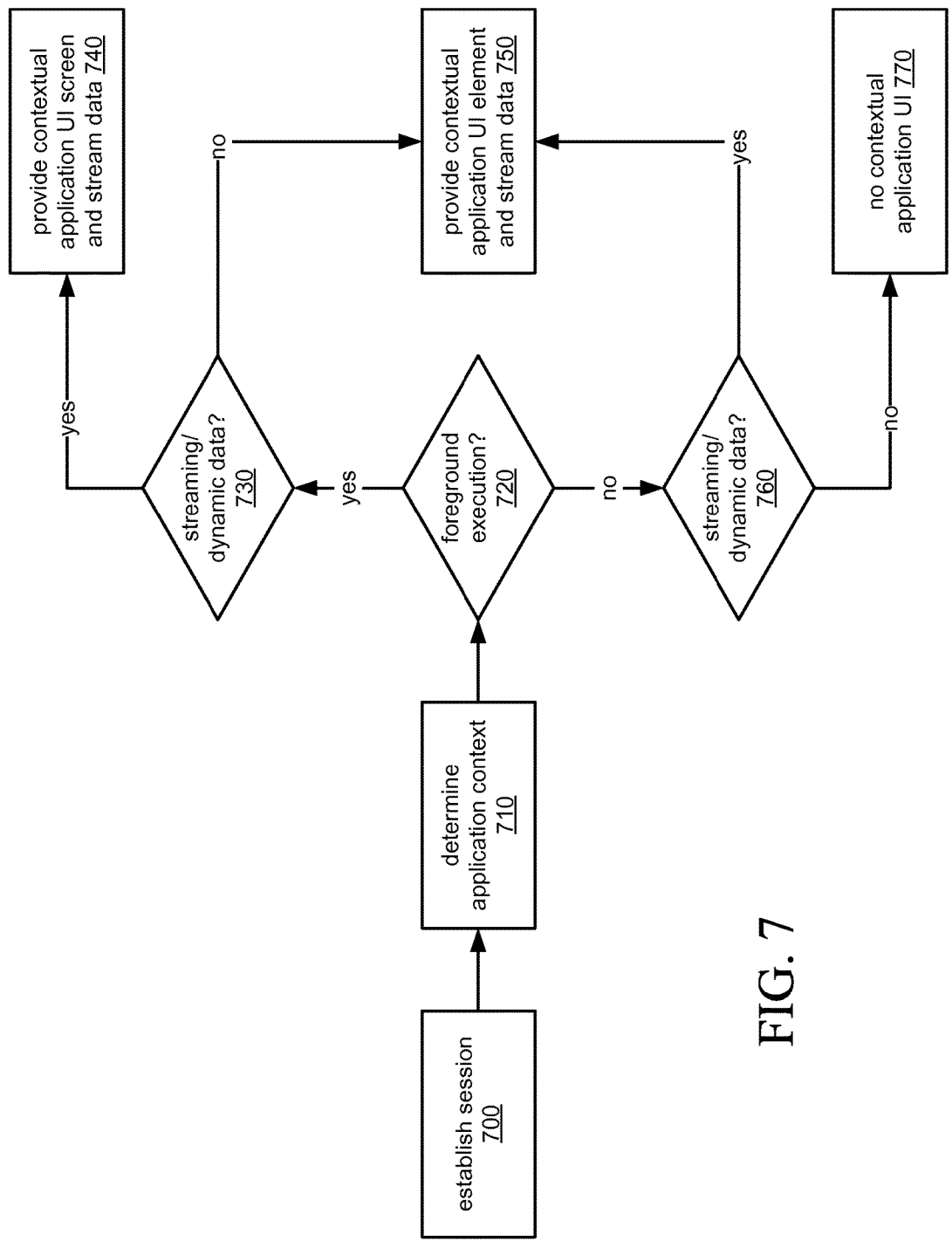
FIG. 7 is a flowchart illustrating a method for applying application context from the mobile device to the user interface of the in-vehicle information system.

FIG. 7 provides an overview of a method for persisting operating context from the mobile device 100 to the in-vehicle information system 200 upon establishment of a session between the device 100 and system 200 in accordance with the rules of Table 1. At 700, a session is established as described above. For each selected application, at 710, a determination is made of the application context at the mobile device 100. This may be carried out by the link component 260 in conjunction with the state module 256. Next, it is determined at 720 whether the application is executing in the foreground. If this is the case, then at 730 it is determined whether the application is currently streaming data or otherwise outputting dynamic data. If the application is doing so, then at 740 the mobile device 100 generates an application UI view reflecting the current operating context. This application UI view and the application's dynamic data are provided to the in-vehicle information system 200 for output. (As noted above, this implementation may apply only to the map/navigation application, or to those applications that display their dynamic data.) If the application is not outputting dynamic data, then at 750 the mobile device 100 generates a homescreen view with an application UI element reflecting the current operating context, and provides this and the dynamic data to the in-vehicle information system 200. Returning to 720, if the application is not executing in the foreground but is determined to be outputting dynamic data at 760, then the method returns to 750. If, however, the application is not outputting dynamic data and is not executing in the foreground, then no contextual information is included in the application UI elements generated by the mobile device 100 at 770.

In the foregoing simple embodiment, the application contexts on the mobile device 100 as of the time of the user's last interaction with the device 100 are persisted in dependence on the current execution state and the current output state of the application. However, consider the case where the application is the calendar application 160; because calendar data is generally static and not dynamic, application context will not be persisted to the vehicle UI views in this embodiment unless the calendar application is executing in the foreground. The foregoing model for persisting context can accordingly be refined by also considering the availability of persisted data for each application on the mobile device 100. Persisted data can include records of recently accessed data or recent user activity within a defined time range, which can be maintained by the application or by the state module 256. Examples of recently accessed data includes "recently played" audio files by the media player 170, the last destination displayed using the map/navigation application 168, and a call log maintained by a phone application. Persisted data can also include application data stored at the device 100 and scheduled for action within a specified future time range, such as upcoming calendar events (e.g. meetings, appointments) and tasks.

Thus, in this embodiment, the current executing state, the availability of persisted data for an application is also used to determine whether an operating context exists at the mobile device that should be persisted to the UI views displayed by the in-vehicle information system 200. The operating context therefore includes the existence of persisted data. As with the simple embodiment, it is generally presumed that applications outputting dynamic data (actively updated data) comprise an operating context that should be persisted to the in-vehicle information system display; in those cases, it is irrelevant whether persisted data is available. However, for all other cases, the existence of persisted data determines whether there is an operating context that can be persisted to the vehicle UI. If persisted data is available for the application, then this context can be visually indicated in the application UI elements in the homescreen provided to the in-vehicle information system 200; otherwise, only a default application UI element is included in the homescreen view for that application. Table 2 below summarizes an example set of rules for determining what type of application UI element is displayed:

TABLE 2

| Current Execution State (Mobile) | Current Output State (Mobile) | Persisted Data (Mobile) | Output Response (Vehicle) |
|---|---|---|---|
| foreground | active | not relevant | bypass homescreen and display application UI for current output (for graphic output) show homescreen and indicate current application context (for audio output) transmit output data to vehicle for output via vehicle output subsystem |
| background | active | not relevant | if homescreen not pre-empted, show homescreen and indicate current application context transmit output data to vehicle for output via vehicle output subsystem |
| foreground | static | available | if homescreen not pre-empted, show homescreen and indicate persisted data context |
| foreground | static | unavailable | if homescreen not pre-empted, show homescreen with default UI element for application |
| background | static | available | if homescreen not pre-empted, show homescreen and indicate persisted data context |
| background | static | not available | if homescreen not pre-empted, show homescreen with default UI element for application |
| not executing | not applicable | available | if homescreen not pre-empted, show homescreen and indicate persisted data context |
| not executing | not applicable | not available | if homescreen not pre-empted, show homescreen with default UI element for application |

The addition of persisted data to the context information therefore expands the amount of context information that will be persisted to the vehicle display.

Figure 8:
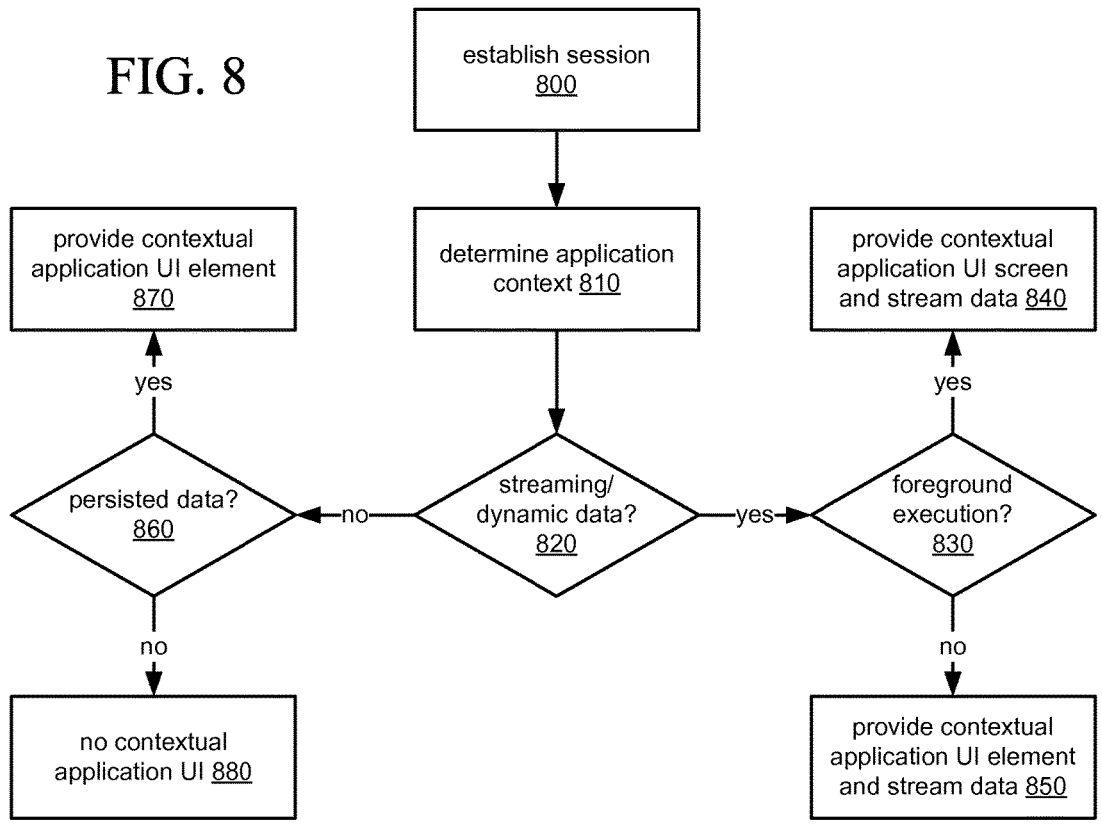
FIG. 8 is a flowchart illustrating a further method for applying application context from the mobile device to the user interface of the in-vehicle information system.

FIG. 8 provides an overview of a method for persisting operating context from the mobile device 100 to the in-vehicle information system 200 upon establishment of a session between the device 100 and system 200 in accordance with the rules set out in Table 2. At 800, a session is established as described above. For each selected application, at 810, a determination is made of the application context at the mobile device 100. Again, this may be carried out by the link component 260 in conjunction with the state module 256. Next, it is determined at 820 whether the application is currently streaming data or otherwise outputting dynamic data executing in the foreground. If this is the case, then at 830 it is determined whether the application is executing in the foreground. If the application is doing so, then at 840 the mobile device 100 generates an application UI view reflecting the current operating context. This application UI view and the application's dynamic data are provided to the in-vehicle information system 200 for output. (Once again, as noted above, this implementation may apply only to the map/navigation application, or to those applications that display their dynamic data.) If the application is not executing in the foreground, then at 850 the mobile device 100 generates a homescreen view with an application UI element reflecting the current operating context, and provides this and the dynamic data to the in-vehicle information system 200.

Returning to 820, if the application is not outputting dynamic data but is determined to be associated with persisted data at 860, then at 870 the mobile device 100 generates a homescreen view with an application UI element reflecting the current operating context, and provides this to the system 200. On the other hand, if there is no persisted data, there is no contextual information to be visually indicated in the homescreen, and the default UI element is provided instead at 880.

The above rules determine whether visual contextual indicators should be provided to the in-vehicle information system 200 for each of the selected applications. In addition to this, the operating context can be used to define the functionality of the application UI elements that are included in the various homescreen views provided to the system 200. The inclusion of persisted data expands the possible range of functionality of the application UI elements. In the foregoing examples, it can be seen that the homescreen view effectively provides a summary of the context executing on the mobile device 100 at the time of handoff, as well as controls enabling the user to interact not only with the currently executing applications or applications with a currently active output state as at the time of handoff, but also other applications that were not currently executing or having a currently active output at the time of handoff.

Figure 9:
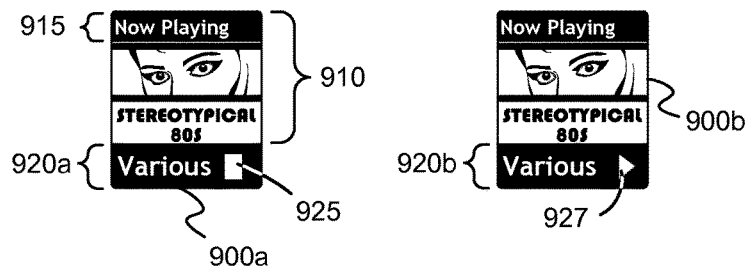
FIG. 9 is a schematic diagram of an application user interface element.

FIG. 9 illustrates example context-specific application UI elements 900*a*, 900*b* for use in the homescreen views displayed by the in-vehicle information system 200. Context-specific elements such as 900*a*, 900*b* visually indicate the operating context of the application as determined at the mobile device 100, and furthermore provide different access to their associated application according to the type of operating context data available from the mobile device 100.

Element 900*a* is a composite element including two portions, here referred to as an "application" portion 910 and an "interaction" portion 920*a*. The application portion 910 can include a visual indicator of the operational context determined for the application by the mobile device 100. Optionally, the application portion 910 can include a caption or other indicia 915 providing additional information about the current operating state of the application. In this particular example, the element 900*a* is a modified application UI element for the media player application, and the graphic in the application portion 910 depicts album cover art provided with an audio file. The application portion 910 of the element 900 is also associated with a first application entry point (which can be a command or request string) for invoking a fullscreen view of the related application. The specific application entry point associated with the application portion 910 may depend on the specific context information available. In the absence of available context information, the first application entry point may be associated with a default fullscreen view for the application, such that when the application portion 910 of the element 900*a* is actuated, the default view of the corresponding application is invoked. Otherwise, if information indicating the most recently displayed view of the application displayed at the mobile device 100 is available, the first application entry point is associated with an application entry point for invoking that most recent view of the application.

The interaction portion 920*a* is associated with a different application entry point, script or process which, when invoked, permits the user to interact with the currently streaming/playing or persisted data associated with the application. In this example, element 900*a* represents the media player and, more specifically, a track that is currently being played. Interaction portion 920*a* of the element 900*a* includes a visual indicator that the track is currently playing in the form of a "pause" button 925. Actuation of the interaction portion 920*a* invokes a process that issues a command to the media player to pause playback. As a result of this command, once playback is paused, the element 900*a* may be updated to the form shown as 900*b*, where the pause button 925 has been changed to a "play" button 927 in the interaction portion 920*b*; actuation of the interaction portion 920*b* would then fire a process that issues a command to the media player to resume playback, and the element 900*b* may then be updated to resemble 900*a* once again. Thus, in this example, interaction comprises toggling playback of the currently playing audio file between "play" and "pause". In other examples that will be described below, the interaction portion may be used to invoke different views of the associated application related to the persisted data, or to invoke other applications to process the persisted data.

By contrast, monolithic application UI elements such as 522 to 528 illustrated in FIG. 5B are neither context-specific, since they do not include any visual indication of the operating context of the application, nor do they provide for interaction with persistent data associated with the application. The elements 522 to 528 of FIG. 5B, like conventional icons, are associated with a single application entry point. In response to actuation of the element, a default view of the associated application is invoked.

As those skilled in the art will appreciate, the layout and arrangement of the elements 900*a*, 900*b* may be varied while remaining within the scope of this description. For instance, the two portions 910, 920 may be displayed separately on the display panel 206. It is convenient, however, for the two portions to be adjacent or nearly adjacent to reduce the amount of time the user must spend studying the homescreen to locate the desired element. As noted above the source of the relevant data for generating these elements 900*a*, 900*b* and associating them with the appropriate application function or view is the mobile device 100.

FIGS. 10 to 17 illustrate specific examples of homescreen and application UI views providing the in-vehicle information system 200 with access to mobile device applications and functions in accordance with the principles discussed above. On launch of the link program 230 at the in-vehicle information system 200, as described above, a session is initiated between the system 200 and the mobile device 100. The mobile device 100 determines the operating contexts for the various selected applications (e.g., phone function, contacts application, map/navigation application, media player, and calendar) at approximately the time the link is established or the session is commenced, and uses the determined operating contexts to generate the UI views for delivery to the system 200.

Figure 10:
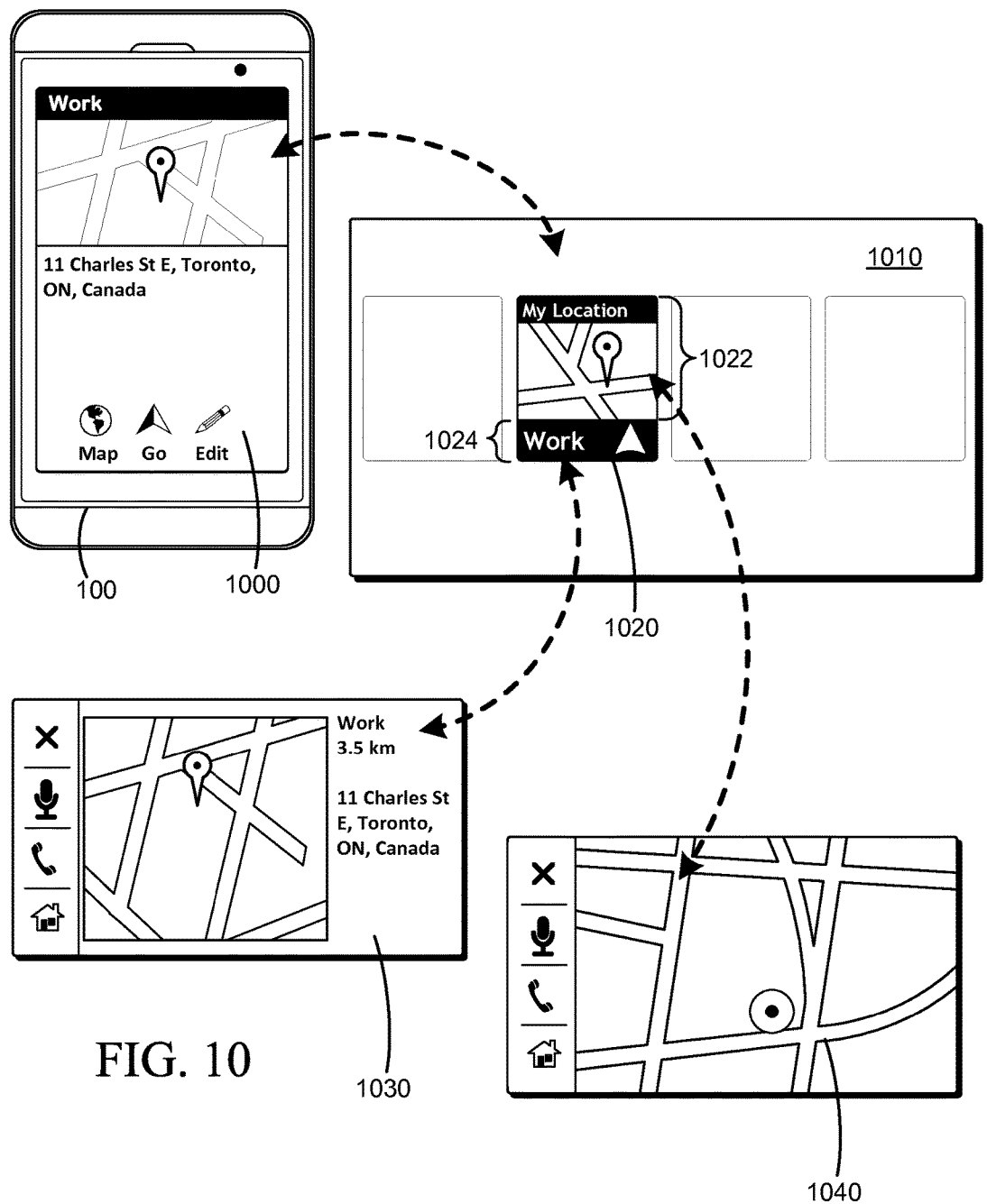
FIGS. 10 and 11 are schematic diagrams illustrating a transfer of user interface context from a map/navigation application on the mobile device to the in-vehicle information system.

Turning first to FIG. 10, a possible operating context of the mobile device 100 is illustrated by view 1000. In this example, the map/navigation application 168 is executing in the foreground of the mobile device 100, and the current view 1000 comprises a display of a currently selected destination. The data being presented by the map/navigation application 168 is thus static rather than dynamic, and the persisted data associated with the application includes the currently selected destination (the selection of this destination is a recent user action, and the destination is the most recently viewed destination). While in this context, the link is established between the mobile device 100 and the system 200, and a session commenced. The link component 260 on the mobile device 100 therefore determines that there is operating context information to be persisted to the in-vehicle information system 200 when access to the map/navigation application 168 is provided via the display panel 206. An application UI element 1020 is therefore generated for the homescreen view 1010. The element 1020 can include an application portion 1022 that in this example is associated with an application entry point for a predetermined default view 1040 of the map/navigation application; in this case, a "follow-me" view, which visually tracks the location of the mobile device 100 as determined by the GPS subsystem 123 or other location sensing component provided on the mobile device 100. On actuation of the application portion 1022 of the element 1020 on the display panel 206, the default view 1040 is invoked and replaces the homescreen view 1010 on the display panel 206.

The element 1020 also includes an interaction portion 1024, which in this case is associated with an application entry point related to the persisted data identified for the application—in this example, the most recently viewed destination as illustrated in the mobile device view 1000. Actuation of the interaction portion 1024 of the element invokes a different view 1030 of the map/navigation application 168 for viewing the location of the most recently viewed destination, without the user having to restart a search or lookup procedure for the destination once the in-vehicle information system 200 is linked to the mobile device 100. The UI view 1010 displayed at the in-vehicle information system 200 thus persists data from the operating context of the mobile device 100—the state in which the user had left the mobile device at the time the link with the system 200 was established—to the vehicle display.

Figure 11:
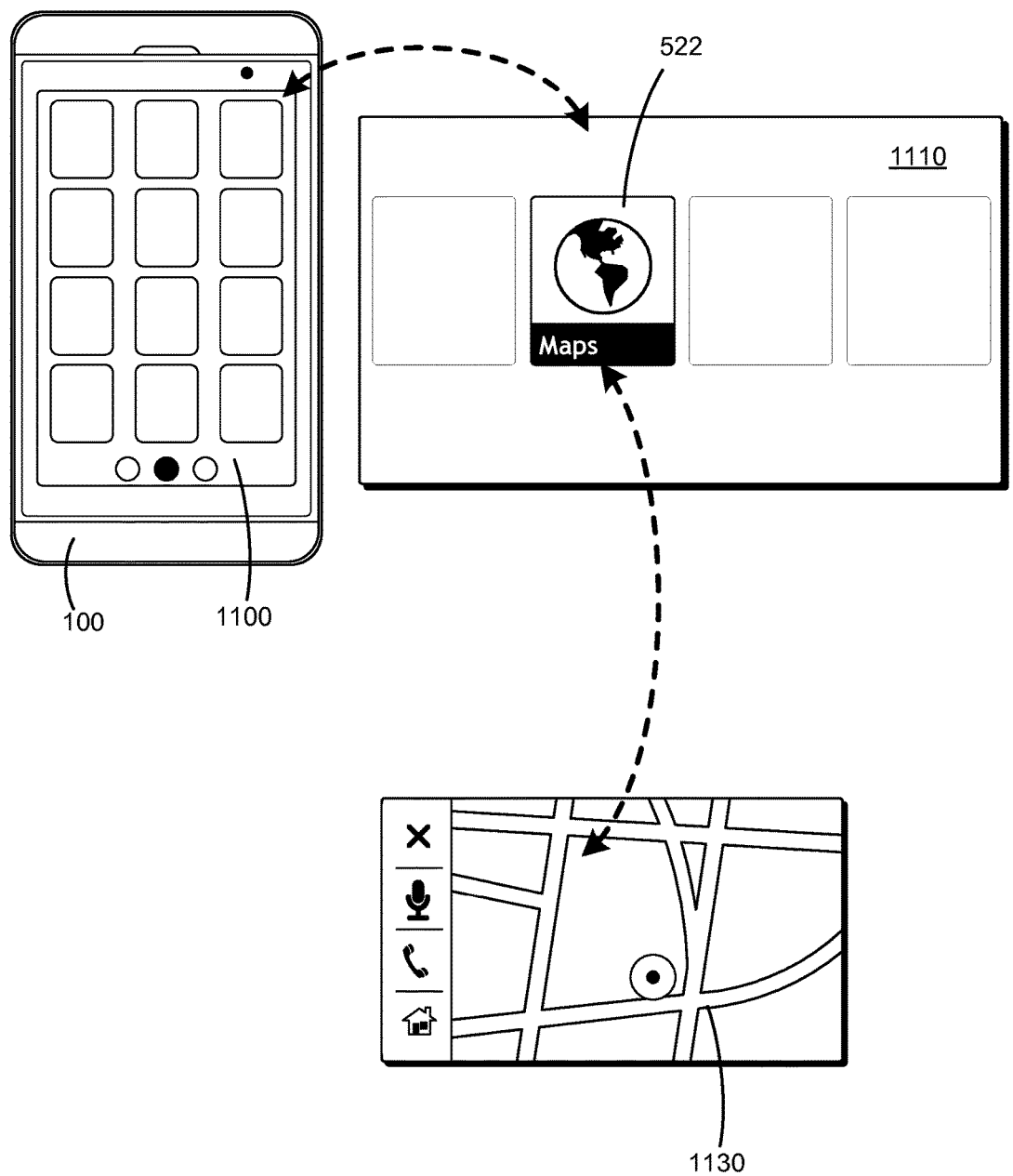

FIG. 11 illustrates another possible operating state of the mobile device 100 in relation to the map/navigation application 168. In this example, the application is either executing in the background or not executing at all at the time the session with the in-vehicle information system 200 is established, as represented by mobile device view 1100, which notionally represents a homescreen view from which applications can be launched. However, no persisted data is currently available for the application (e.g., no recently viewed destinations). Accordingly, because there is no operating context data available for the map/navigation application in this case, the homescreen view 1110 provided to the in-vehicle information system 200 comprises the default UI element 522 for the application. As explained above, the default UI element 522 is associated with a default view of the map/navigation application 168, and is not context-specific. When the default UI element 522 is invoked, the predetermined default application view 1130 is invoked, which as in the example of FIG. 10 is the "follow-me" view of the application 186.

Figure 12:
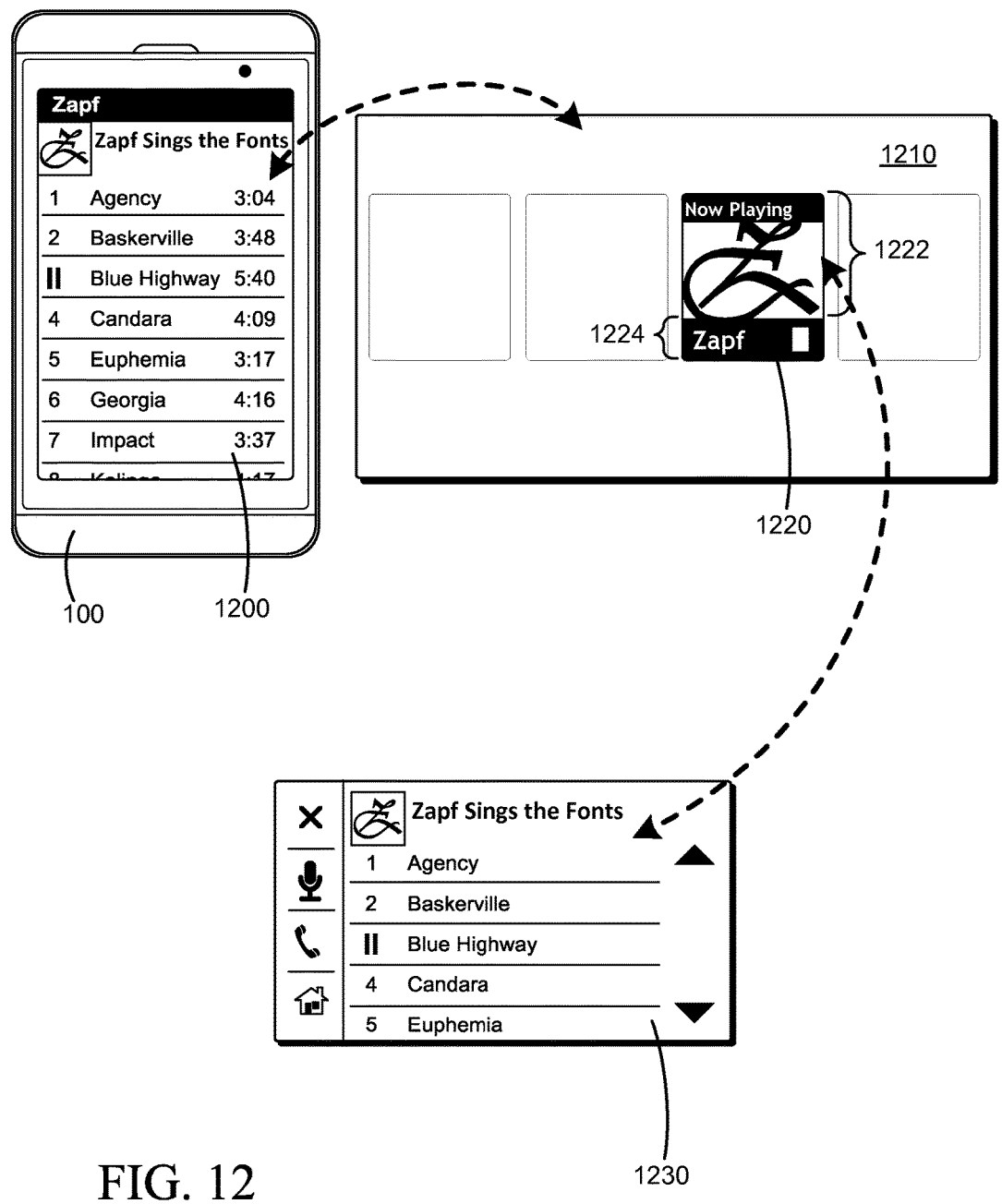
FIGS. 12 to 14 are schematic diagrams illustrating a transfer of user interface context from a media player application on the mobile device to the in-vehicle information system.
Figure 13:
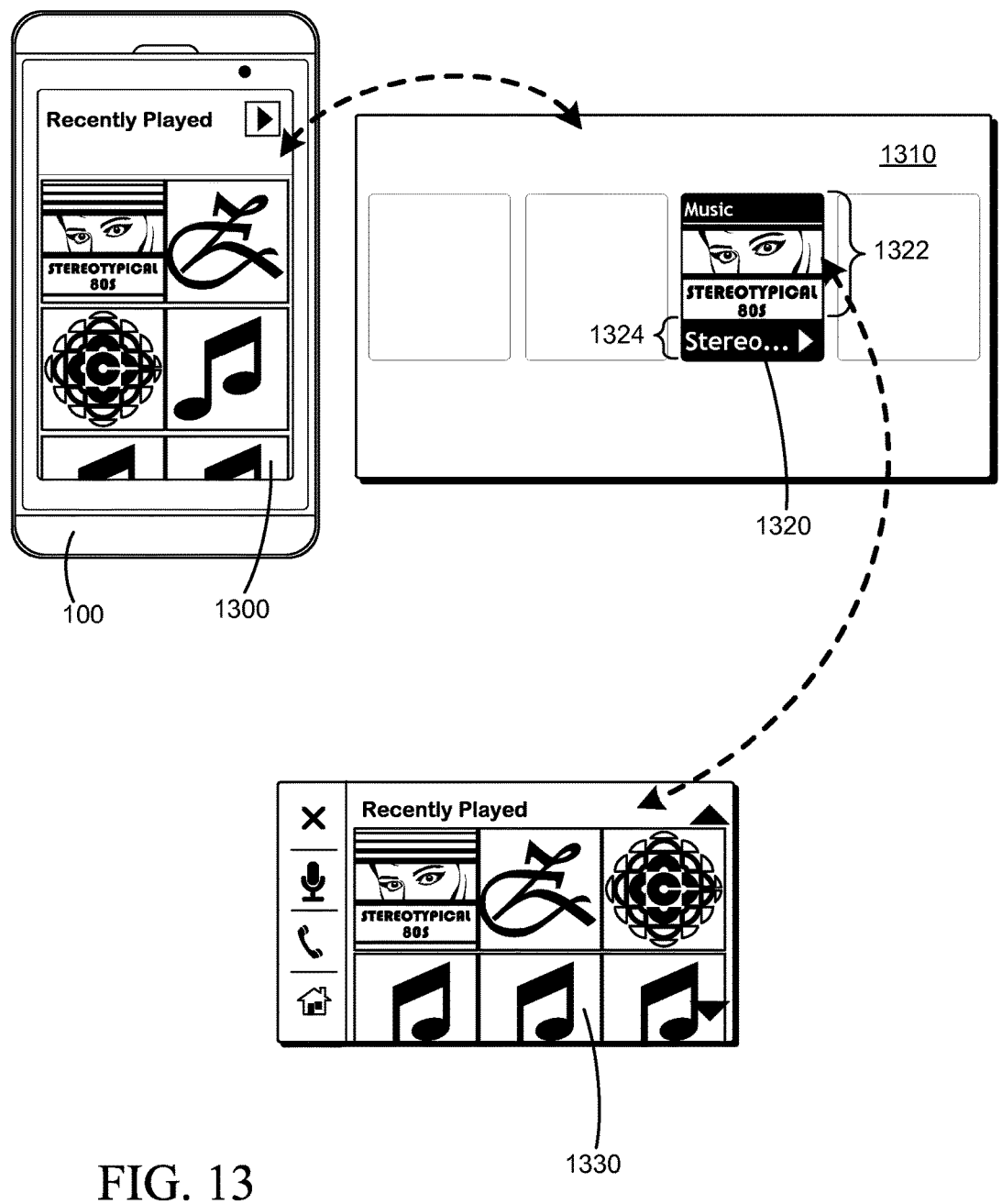
Figure 14:
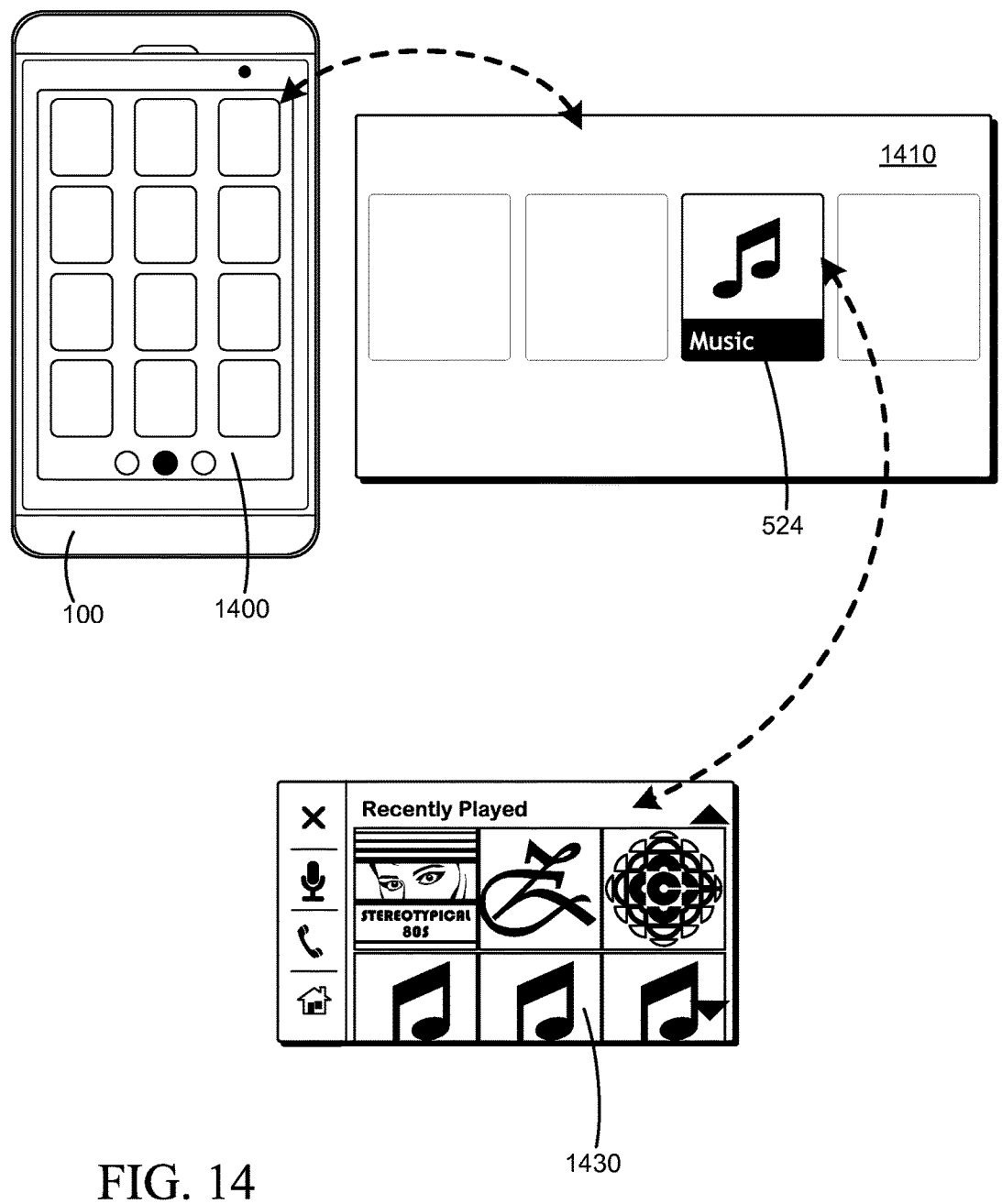

FIGS. 12 to 14 illustrate examples of user interface elements related to the media player application 170. Starting with FIG. 12, the mobile device 100 is currently executing the media player 170 either in the foreground or background (the view 1200 shown in FIG. 12 illustrates a foreground view comprising a track listing), and the media player 170 is currently playing an audio track. In this example, persisted data is not relevant to the assessment of the operating context of the media player 170. While the mobile device 100 is executing in this context, the link is established between the device 100 and the system 200, and a session commenced. The link component 260 determines that there is operating context information to be persisted to the system 200. An application UI element 1220 is therefore generated for a homescreen view 1210, the element comprising an application portion 1222 and an interaction portion 1224. The application portion 1222 is associated with an application entry point for a fullscreen version of the media player 170. In this example, the application entry point is for the most recently accessed view 1230 of the media player; in this case, as can be seen from the view 1200, a track listing view. Accordingly, in response to actuation of the application portion 1222 of the element 1220, the track listing view 1230 of the media player 170 is invoked and displayed on the vehicle system display 206. The interaction portion 1224, like the interaction portions described in FIG. 9, is associated with a function that enables the user to interact with the currently playing track.

In FIG. 13, the mobile device 100 is not currently playing any media files, but is currently executing in the foreground and displaying static data including recently played music in a mobile device view 1300. The recently played music constitutes persisted data for the media player 170. Accordingly, the link component 260 would determine upon the establishment of the session with the in-vehicle information system 200 that there is application context information to be persisted to the vehicle UI view. Again, an application UI element 1320 having an application portion 1322 and an interaction portion 1324 is generated. The application portion 1322 is associated with an application entry point for the most recently accessed view 1330 of the media player, which will also comprise a listing of recently played music. The interaction portion 1324 in this case is associated with functions for interacting with the persisted data: actuating the interaction portion 1324 toggles between playback of tracks in the recently played music listing, and pausing playback.

FIG. 14 illustrates another case in which the media player is not executing at the time the session is established between the mobile device 100 and the in-vehicle information system 200, as depicted by the homescreen view 1400 on the mobile device 100. Accordingly, the default application UI element 524 is displayed in the homescreen view 1410 for the in-vehicle information system 200, and actuation of that element 524 invokes a predetermined default view 1430 of the media player 170 for display on the vehicle display panel 206, since there is no most recently accessed view information in this case for the media player 170.

Figure 15:
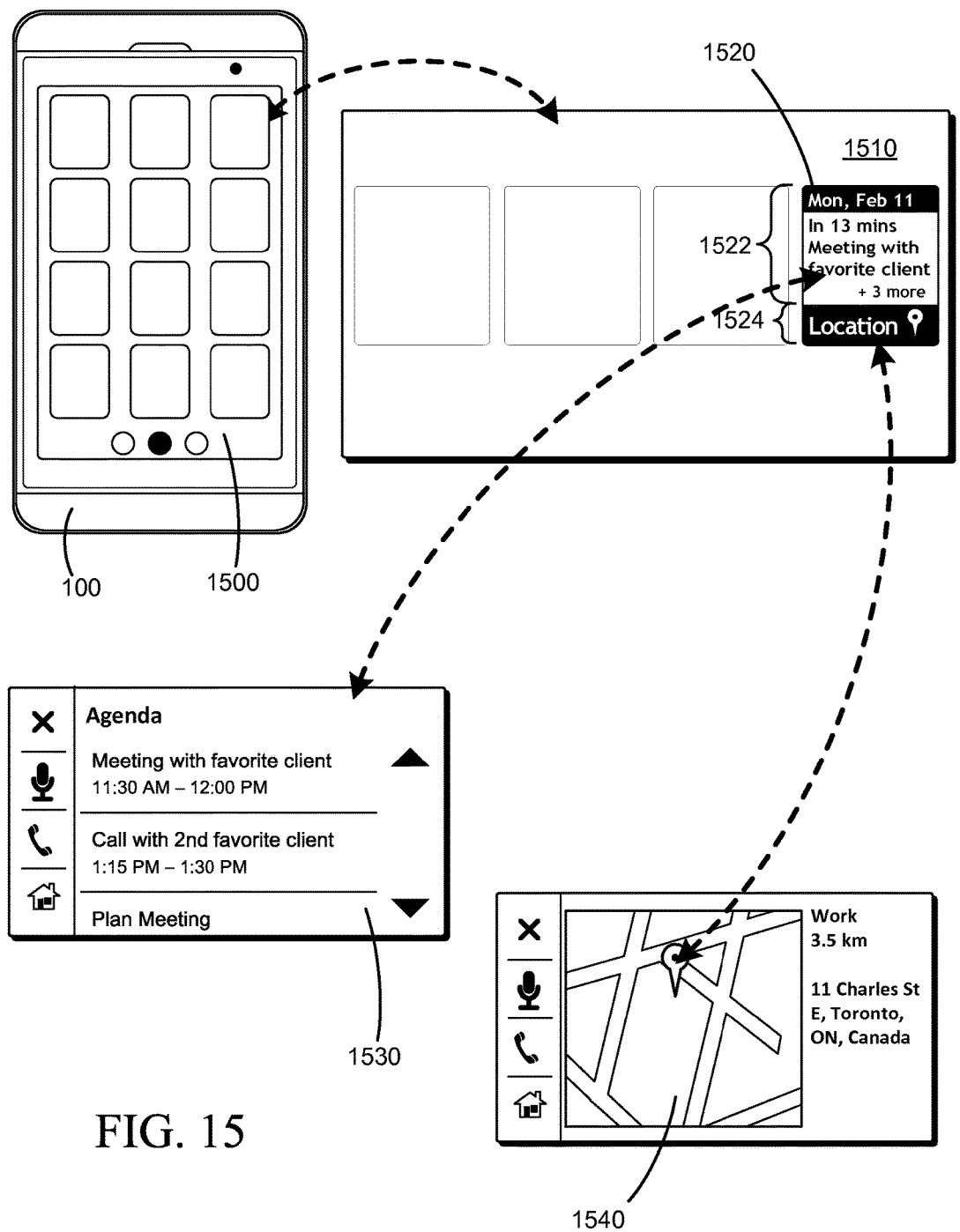
FIGS. 15 to 17 are schematic diagrams illustrating a transfer of user interface context from a calendar application on the mobile device to the in-vehicle information system.
Figure 16:
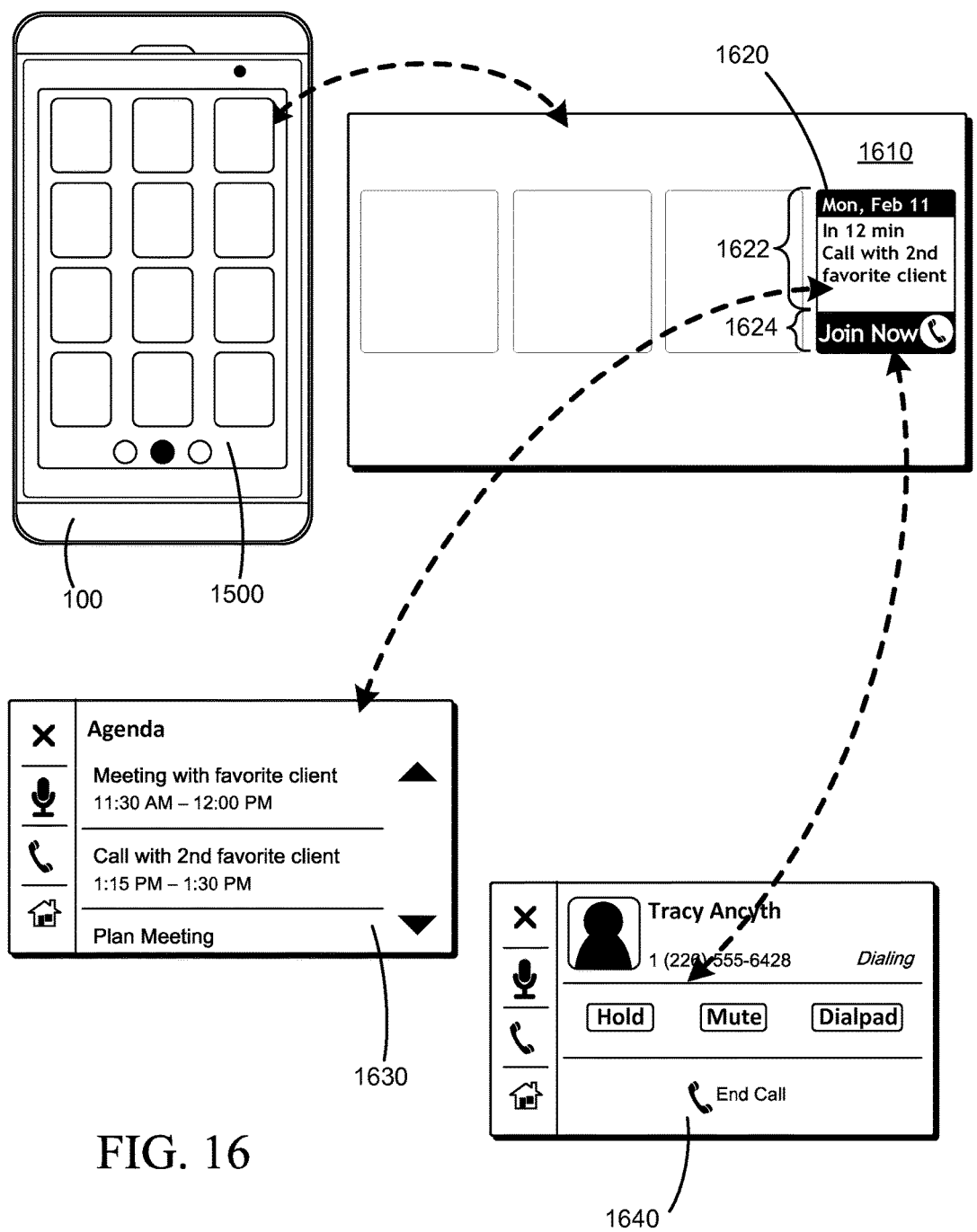
Figure 17:
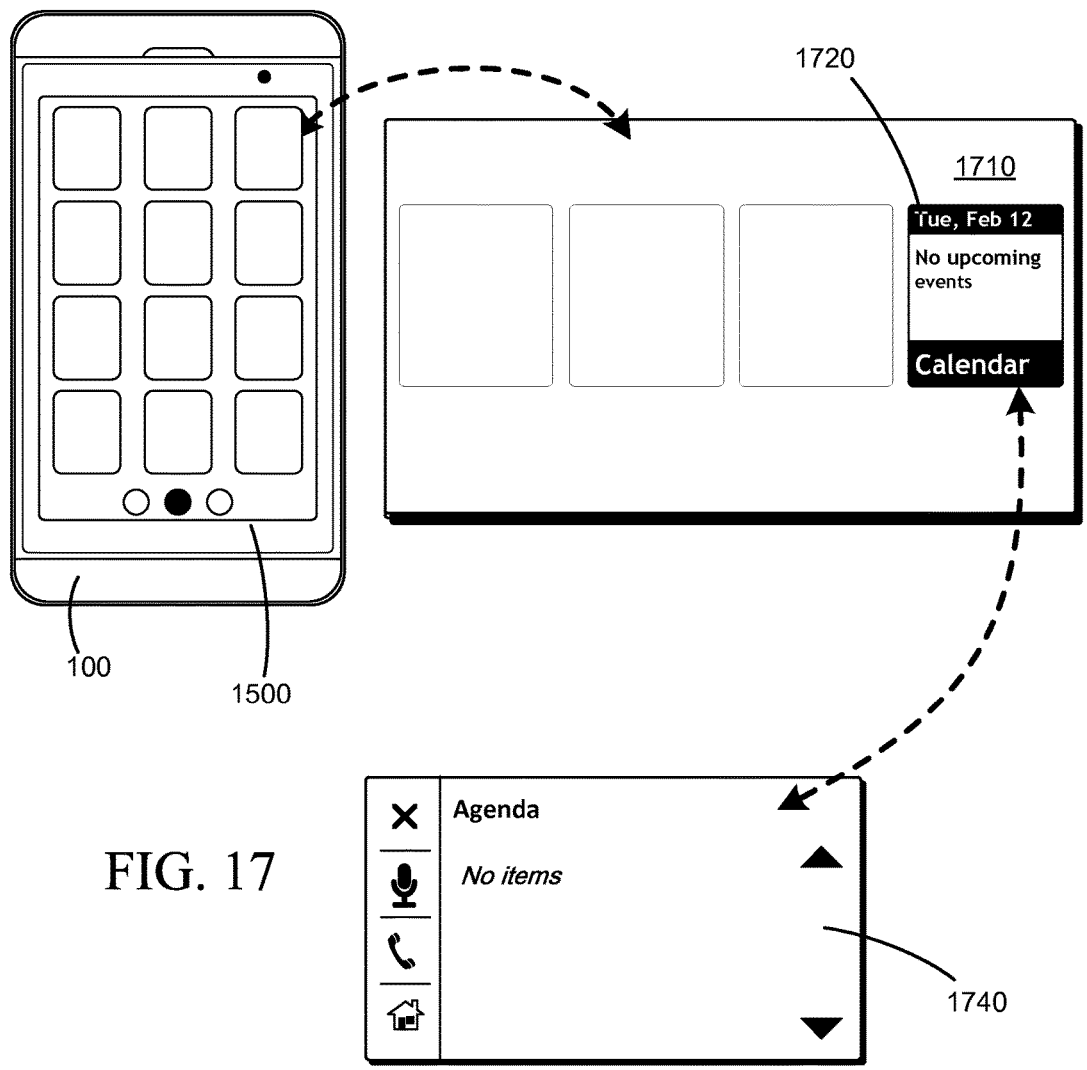

FIGS. 15 to 17 illustrate implementation examples with the calendar application 160. Given that calendar data tends to be static rather than dynamic, these examples rely heavily on persisted data being available on the mobile device 100 to provide context in the vehicle homescreen views. As a first example, illustrated in FIG. 15, consider that a meeting or other calendar event is either occurring at the present time, or else coming up within a fixed time period (e.g., within the next 12 hours, or during the current day). Upcoming events are typically tracked on the mobile device 100 in a background process, even when the calendar application has not be explicitly launched on the mobile device 100 by the user; accordingly, the mobile device view 1500 in FIGS.

15 to 17 is simply illustrated as the mobile device homescreen, and it is assumed that the persisted data, rather than the actual execution state of the calendar application, will be determinative of how context will be persisted to the vehicle UI.

In this example, then, there is persisted data that can be reflected in the homescreen view 1510 by the in-vehicle information system 200. Accordingly, a composite UI element 1520 is generated, comprising an application portion 1522 and an interaction portion 1524. The application portion 1522 can include information relating to the persisted data (e.g., a description of the next upcoming meeting), and is associated with application entry point for a predetermined default view 1530 for the calendar application. In this case, the predetermined default view 1530 is an agenda view, which is populated with upcoming events scheduled over a defined period (e.g., over the next 12 or 24 hours, or for the current day). The interaction portion 1524 of the UI element 1520 is associated with the most imminent persisted data provided by the calendar application, and actuation of the interaction portion 1524 can invoke a corresponding application according to the type of persisted data available. For instance, in FIG. 15, the most imminent persisted data item is a calendar event for which a location was defined. The link component 260, in constructing the UI element 1520, may retrieve the location data from the calendar event and generate an application entry point or string comprising the location as input for the map/navigation application 168. Therefore, when the interaction portion 1524 is invoked on the vehicle display 206, a destination view 1540 of the map/navigation application 168 is automatically invoked, showing the location of the calendar event, and displayed on the display panel 206.

FIG. 16 illustrates a variation of the example of FIG. 15, where the calendar event is a conference call and therefore does not include a geographic location, but rather a telephone number. Accordingly, the composite UI element 1620 in the vehicle homescreen view 1600 includes the application portion 1622, which operates in substantially the same manner as the application portion 1522 of FIG. 15, and invokes the agenda view 1630 of the calendar application on the vehicle display 206 when actuated. However, the interaction portion 1624 is now associated with an entry point or string comprising the telephone number retrieved from the calendar event as input for the phone application on the mobile device 100. Thus, actuation of the interaction portion 1624 will invoke a phone application view 1640 and automatically dial the telephone number so that the user can easily join in the conference call.

FIG. 17 illustrates a case where there are no calendar events available for the upcoming fixed period, and so there is no currently available persisted data to be associated with the application UI element 1720 to be displayed in the vehicle homescreen view 1700. In this case, the default UI element may be adapted to reflect this information, as shown in the UI element 1720. The UI element 1720 is simply associated with a single application entry point for invoking the default view 1740 of the calendar application on the vehicle display 206.

It will be appreciated by those skilled in the art that similar adaptations may be made for other application UI elements that can be displayed on the vehicle homescreen view. For instance, for a phone/contacts application, persisted data such as a log of recent callers, or most frequently called contacts, may be used to provide contextual information for the UI elements displayed on the vehicle display for invoking the phone or contacts application.

The foregoing examples illustrate the use of one or more of a mobile device application's current executing state, current output state, and persisted data to provide continuity of user experience when operation of the mobile device 100 transitions from the mobile device 100 to an in-vehicle information system 200. The continuity of user experience is obtained by storing, then propagating, the application's operating context on the mobile device 100 to the in-vehicle information system display panel 206. The propagation can occur for all applications at the time a link is established between the device 100 and the system 200, as generally described in the foregoing examples; however, it can also occur on an application-by-application basis as each application is accessed or launched on the system 200. Thus, although certain aspects of the mobile device UI views (e.g., the orientation, layout, etc.) are modified in order to suit the in-vehicle environment, important aspects of the mobile user interface—such as the "most recently viewed" application view, persisted data, currently displayed maps and currently playing media files—are persisted even after the connection to the in-vehicle information system 200 is made. By providing the link component 260 on the mobile device 100, and configuring the mobile device 100 to persist and propagate context information to the in-vehicle information system 200, it is not necessary for the context information or application state information, generally, to be stored at a third-party component, such as a remote server accessible over wireless connections by both the mobile device 100 and the system 200. However, it will be appreciated by those skilled in the art that a further embodiment may be implemented where the link component 260 functions may be provided on a remote server or other device, which therefore mediates communications between the system 200 and the applications executing on the mobile device 100.

Conversely, when the session between the in-vehicle information system 200 and the mobile device 100 ends, the state of the system 200 can be persisted on the mobile device 100 so that the mobile device applications corresponding to the current operating context of the system 200 can resume execution on the mobile device 100 in a manner consistent with the in-vehicle information system context at the time the link between the system and the device 100 was severed. FIG. 18 illustrates an example method of propagating application context between the mobile device 200 and the in-vehicle information system 200 environments. Starting at 1800, it is determined that application context is to be propagated from one UI environment to another. In the case where a session is being established, as described above, the current application context of the mobile device—which includes the current UI and output state of the mobile device—is to be transferred to the in-vehicle information system 200 and presented in a UI at the system 200. In the case where a session is being terminated, the context represented by the UI presented by the system 200 must be transferred back to the UI environment presented by the mobile device 100. At 1810, for each qualifying application, an application context is determined in the initial UI environment, and the application context data is stored at 1820 by the state module 256. Only a predetermined set of applications present on the mobile device 100 may be made accessible via the in-vehicle information system 200; thus, if another application that is not part of this subset is currently executing on the mobile device 100, its context need not be preserved for the purpose of propagation to the in-vehicle information system 200 UI, although its context or other state information may certainly be stored by the mobile device 100. A qualifying application may be an application that is part of this predetermined set, or an application that is configured to provide UI screens that are adapted for presentation via the in-vehicle information system 200.

At 1830, it is determined from the context data whether the application is in focus, or executing in the foreground with a UI screen being displayed in the initial UI environment. If this is the case, when context is transferred to the other UI environment, the current UI screen is closed or minimized since an application should be in focus in one environment at a time; accordingly, at 1840, the application UI screen in the initial UI environment (whether this is the vehicle or the mobile device) is minimized, i.e., removed from focus. "Minimizing" may include demoting the application to a background process, reducing the application screen to a tile in a multitasking screen, or hiding the application screen altogether. Finally, at 1850, the context of the application is propagated to the second UI environment, as generally described above. The different rules and examples discussed above may be applied when context is transferred from the mobile device UI to the in-vehicle information system UI, and also as appropriate when context is transferred from the in-vehicle information system UI to the mobile device UI. For example, when a given application is executing in the foreground and is in focus in the vehicle UI environment, on termination of the link session between the in-vehicle information system 200 and the mobile device 100, the application UI presented in the vehicle is minimized, and application generates a view for presentation on the mobile device, and continues to execute in the foreground on the mobile device with its screen in focus. Put another way, on termination of the session, a currently active application alters its output screen to adapt to the mobile device display no. As another example, when an application is executing in the background and actively outputting data but is not in focus at the in-vehicle information system 200 when the session is terminated, the application UI presented in the vehicle may not need to be changed since it is not in focus; however, on termination of the session, the application continues to execute in the background but redirects its output data to a local subsystem provided on the mobile device 100. If the application is executing in the background but its current output state is static, or if the application is not executing at all, then on termination of the session there may be no change to the application's UI state.

FIG. 19 details this procedure where an application is actively outputting data, as in the case of streaming music. Upon receipt of an instruction to terminate an ongoing session 1900 (which may be received at either the in-vehicle information system 200 or the mobile device 100), the current operating context for each of the selected applications is assessed at 1910 in a manner similar to that described above. The operating context data can then be stored at the mobile device 100 at 1920. The assessment of the operating context for each application can be carried out by the link component 260 and/or the state module 256 in a similar manner to that described above. Any ongoing data streams being transmitted from the mobile device 100 to the system 200 are terminated at 1930, and output resumes via normal mobile device 100 I/O subsystems. In the case of a voice call using the vehicle's I/O subsystems that was ongoing at the time the session was terminated, in addition to terminating the streaming, the mobile device 100 may automatically place the call on hold, and optionally issue an audible notification to remind the user to resume the call. Finally, at 1940 the mobile device 100 re-invokes the various applications that were executing at the time the session was terminated and applies the stored context information to return the applications to the same state they were in at the time of termination at 1900.

As mentioned above, in the case of the map/navigation application 168, the initial transport modality used in turn-by-turn navigation on the mobile device 100 may be walking, bicycling, or public transit (i.e., a mode of transport other than driving a motor vehicle). Upon initiating the link with the vehicle, the modality could be automatically switched to driving. Thus, while the context on the mobile device 100 is generally preserved (the current display of the turn-by-turn navigation view is persisted to the vehicle information system 200), additional context from the vehicle is combined with the original mobile device context. Conversely, when the link with the vehicle is terminated, if the turn-by-turn navigation feature is currently being displayed by the in-vehicle information system 200, the turn-by-turn navigation context can be persisted to the mobile device 100, but in addition, the mode of transport is automatically changed to walking or public transit to reflect the fact that the user has exited a vehicle.

In some implementations, the security manager 258 on the mobile device 100 operates to restrict the types of data that are output to the in-vehicle information system 200. For instance, if the link between the system 200 and the mobile device 100 is established while the mobile device 100 is operating under the user's "personal" or non-sensitive profile, access to sensitive data and/or applications is restricted by the security manager 258. Thus, for instance, media data may be streamed without restriction to the in-vehicle information system 200 because the media data is not assigned to the "sensitive" data category, but work-related calendar data, which is designated as "sensitive", is restricted by the security manager 258 and is not included in the persisted data that is used by the link component 260 to generate user interface data and elements for provision to the in-vehicle information system 200.

There is accordingly provided a method, comprising: establishing, by a mobile device, a session with an in-vehicle information system; determining an operating context for at least one application executing on a mobile device, the operating context comprising one or more of a current execution state, a current output state, an availability of persisted data, and a most recently displayed application user interface view; and defining, using the operating context for the at least one application, a user interface view for display by the in-vehicle information system.

In one aspect, the operating context comprises the current execution state and the current output state; and for a first application of the at least one application executing on the mobile device: the current execution state is a foreground execution state; the current output state is an active state; and the user interface view for display by the in-vehicle information system comprises an application user interface view for the first application.

In another aspect, the active state comprises current playback of an audio file.

In still another aspect, when for a second application of the at least one application executing on the mobile device: the current execution state is a background execution state; and the current output state is a static state, the user interface view for display by the in-vehicle information system comprises the application user interface view for the first application.

Still further, the operating context may comprise the current execution state and the current output state; and for a first application of the at least one application executing on the mobile device: the current execution state is a background execution state; the current output state is an active state; and the user interface view for display by the in-vehicle information system comprises a homescreen view for the in-vehicle information system, the homescreen view comprising application user interface elements for accessing a plurality of applications including the first application.

In yet another aspect, the application user interface element for accessing the first application comprises an indicator of the operating context of the first application.

In a further aspect, the application user interface element for accessing the first application comprises: a first portion comprising the indicator of the operating context of the first application, the first portion being actuatable to access the first application at a first application entry point; and a second portion actuatable to access the first application at a second application entry point, the second application entry point providing access to interact with current output of the first application.

Still further, when for a second application of the at least one application executing on the mobile device: the current execution state is a foreground execution state; and the current output state is a static state, the homescreen view includes an application user interface element for accessing the second application, said application user interface element comprising an indicator of the operating context of the second application.

And still further, the operating context comprises the current execution state, the current output state, and the availability of persisted data; and for a first application of the at least one application executing on the mobile device: the current execution state is a foreground execution state; the current output state is an active state; and the user interface view for display by the in-vehicle information system comprises an application user interface view for the first application.

And in yet another aspect, the operating context comprises the current execution state, the current output state, and the availability of persisted data; and for a first application of the at least one application executing on the mobile device: the current execution state is a foreground execution state; the current output state is a static state; and the user interface view for display by the in-vehicle information system comprises a homescreen view for the in-vehicle information system, the homescreen view comprising application user interface elements for accessing a plurality of applications including the first application, the application user interface element for the first application comprising an indication of the persisted data.

Still further, when for a second application of the at least one application executing on the mobile device: the current execution state is a background execution state; the current output state is a static state; and persisted data is available, the homescreen view includes an application user interface element for accessing the second application comprising an indication of the persisted data for the second application.

In another aspect, the user interface view is defined by the at least one application executing at the mobile device.

There is also provided a mobile device, which can include a display, at least one communications subsystem, and at least one suitable processor, which are adapted to implement the features of any of the above-described methods.

There is also provided a system including the above-described mobile device and in-vehicle information system adapted to implement the features of any of the above-described methods.

There is still further provided a data-bearing medium, which may be physical or non-transitory, bearing or storing code which, when executed by a suitable device, causes the device to implement any of the above-described methods and variants.

It should be understood that steps and the order of the steps in the processing described herein may be altered, modified and/or augmented and still achieve the desired outcome. Throughout the specification, terms such as "may" and "can" are used interchangeably and use of any particular term should not be construed as limiting the scope or requiring experimentation to implement the claimed subject matter or embodiments described herein. Further, the various features and adaptations described in respect of one example or embodiment in this disclosure can be used with other examples or embodiments described herein, as would be understood by the person skilled in the art.

The systems' and methods' data may be stored in one or more data stores. The data stores can be of many different types of storage devices and programming constructs, such as RAM, ROM, flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. Various functional units described herein have been expressly or implicitly described as modules and agents, in order to more particularly emphasize their independent implementation and operation. It is also noted that an agent, module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The various functional units may be implemented in hardware circuits such as custom VLSI circuits or gate arrays; field-programmable gate arrays; programmable array logic; programmable logic devices; commercially available logic chips, transistors, and other such components. Modules implemented as software for execution by a processor or processors may comprise one or more physical or logical blocks of code that may be organized as one or more of objects, procedures, or functions. The modules need not be physically located together, but may comprise code stored in different locations, such as over several memory devices, capable of being logically joined for execution. Modules may also be implemented as combinations of software and hardware, such as a processor operating on a set of operational data or instructions.

A portion of the disclosure of this patent document contains material which is or may be subject to one or more of copyright, design patent, industrial design, or unregistered design protection. The rights holder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A method, comprising:

establishing, by a mobile device, a session with an in-vehicle information system;

in response to establishing the session with the in-vehicle information system, determining an application specific operating context for two or more applications executing on the mobile device, the application specific operating context for each respective application comprising one or more of a current execution state, a current output state, an availability of persisted data, and a most recently displayed application user interface view;

in response to determining that persisted data is available for at least one application executing on the mobile device, generating a user interface view including a homescreen view having a set of user interface icons for accessing individual applications executing on the mobile device, the set of user interface icons including one or more modified user interface icons with added persisted data indications, wherein the one or more modified user interface icons with the added persisted data indications are associated with the respective application having persisted data, and wherein the one or more modified user interface icons respectively include a first icon portion actuatable to access the respective application at a first entry point and a second icon portion actuatable to access the respective application at a second entry point, the second entry point providing access to interact with current output of the respective application, and wherein the first icon portion displays the persisted data indicators of the operating context of the respective application, and wherein the persisted data includes records of recently accessed data or recent user activity as determined when the session between the mobile device and the in-vehicle information system was established; and transmitting the generated user interface view to the in-vehicle information system to cause the generated user interface view to be displayed on the in-vehicle information system and to enable interaction with the one or more modified user interface icons with the added persisted data indications, and wherein the one or more applications are inaccessible on the mobile device for the duration of the session.

2. The method of claim 1, wherein the operating context comprises the current execution state and the current output state; and for a first application of the one or more applications executing on the mobile device:

the current execution state is a foreground execution state;
the current output state is an active state; and
the user interface view for display by the in-vehicle information system comprises an application user interface view for the first application.

3. The method of claim 2, wherein when for a second application of the one or more applications executing on the mobile device:

the current execution state is a background execution state; and the current output state is a static state,
the user interface view for display by the in-vehicle information system comprises the application user interface view for the first application.

4. The method of claim 1, wherein the operating context comprises the current execution state and the current output state; and for a first application of the one or more applications executing on the mobile device:

the current execution state is a background execution state;
the current output state is an active state; and
the user interface view for display by the in-vehicle information system comprises the homescreen view for the in-vehicle information system, the homescreen view comprising the set of user interface icons for accessing the one or more applications including the first application.

5. The method of claim 4, wherein the user interface icon for accessing the first application comprises a persisted data indicator of the operating context of the first application.

6. The method of claim 5, wherein when for a second application of the at least one application executing on the mobile device:

the current execution state is a foreground execution state; and
the current output state is a static state,
the homescreen view includes a user interface icon for accessing the second application, said user interface icon for accessing the second application comprising a persisted data indicator of the operating context of the second application.

7. The method of claim 1, wherein the operating context comprises the current execution state, the current output state, and the availability of persisted data; and for a first application of the at least one application executing on the mobile device:

the current execution state is a foreground execution state;
the current output state is an active state; and
the user interface view for display by the in-vehicle information system comprises an application user interface view for the first application.

8. The method of claim 1, wherein the operating context comprises the current execution state, the current output state, and the availability of persisted data; and for a first application of the at least one application executing on the mobile device:

the current execution state is a foreground execution state;
the current output state is a static state; and
the user interface view for display by the in-vehicle information system comprises the homescreen view for the in-vehicle information system, the homescreen view including the set of user interface icons for accessing the one or more applications including the first application, the user interface icon for the first application comprising a persisted data indication of the persisted data.

9. The method of claim 8, wherein when for a second application of the at least one application executing on the mobile device:

the current execution state is a background execution state;
the current output state is a static state; and
persisted data is available,
the homescreen view includes a user interface icon for accessing the second application comprising a persisted data indication of the persisted data for the second application.

10. The method of claim 1, wherein the generated user interface view is defined by the at least one application executing at the mobile device.

11. The method of claim 1, wherein user interface icons with persisted data indications include two or more actuatable interface portions for invoking different views of persisted data.

12. A mobile device, including:
a communications subsystem adapted for communication with an in-vehicle information system;
a memory adapted to store operating context for at least one application executing on the mobile device; and
a processor configured to enable:
establishing, using the communications subsystem, a session with the in-vehicle information system;
in response to establishing the session with the in-vehicle information system, determining an application specific operating context for two or more applications executing on the mobile device, the application specific operating context for each respective application comprising one or more of a current execution state, a current output state, an availability of persisted data, and a most recently displayed application user interface view;
in response to determining that persisted data is available for at least one application executing on the mobile device, generating a user interface view including a homescreen view having a set of user interface icons for accessing individual applications executing on the mobile device, the set of user interface icons including one or more modified user interface icons with added persisted data indications, wherein the one or more modified user interface icons with the added persisted data indications are associated with the respective application having persisted data,
and wherein the one or more modified user interface icons respectively include a first icon portion actuatable to access the respective application at a first entry point and a second icon portion actuatable to access the respective application at a second entry point, the second entry point providing access to interact with current output of the respective application, and wherein the first icon portion displays the persisted data indicators of the operating context of the respective application,
and wherein the persisted data includes records of recently accessed data or recent user activity as determined when the session between the mobile device and the in-vehicle information system was established; and
transmitting the generated user interface view to the in-vehicle information system to cause the generated user interface view to be displayed on the in-vehicle information system and to enable interaction with the one or more modified user interface icons with the added persisted data indications, and wherein the one or more applications are inaccessible on the mobile device for the duration of the session.

13. The mobile device of claim 12, wherein the operating context comprises the current execution state and the current output state; and for a first application of the one or more applications executing on the mobile device:
the current execution state is a foreground execution state;
the current output state is an active state; and
the user interface view for display by the in-vehicle information system comprises an application user interface view for the first application.

14. The mobile device of claim 13, wherein the active state comprises current playback of an audio file.

15. The mobile device of claim 13, wherein when for a second application of the one or more applications executing on the mobile device:
the current execution state is a background execution state; and
the current output state is a static state,
the user interface view for display by the in-vehicle information system comprises the application user interface view for the first application.

16. The mobile device of claim 12, wherein the operating context comprises the current execution state and the current output state; and for a first application of the one or more applications executing on the mobile device:
the current execution state is a background execution state;
the current output state is an active state; and
the user interface view for display by the in-vehicle information system comprises the homescreen view for the in-vehicle information system, the homescreen view including the set of user interface icons for accessing the one or more applications including the first application.

17. The mobile device of claim 16, wherein the user interface icon for accessing the first application comprises a persisted data indicator of the operating context of the first application.

18. The mobile device of claim 17, wherein when for a second application of the at least one application executing on the mobile device:
the current execution state is a foreground execution state; and
the current output state is a static state,
the homescreen view includes a user interface icon for accessing the second application, said user interface icon for accessing the second application comprising a persisted data indicator of the operating context of the second application.

19. The mobile device of claim 12, wherein the operating context comprises the current execution state, the current output state, and the availability of persisted data; and for a first application of the at least one application executing on the mobile device:
the current execution state is a foreground execution state;
the current output state is an active state; and
the user interface view for display by the in-vehicle information system comprises an application user interface view for the first application.

20. The mobile device of claim 12, wherein the operating context comprises the current execution state, the current output state, and the availability of persisted data; and for a first application of the at least one application executing on the mobile device:
the current execution state is a foreground execution state;
the current output state is a static state; and
the user interface view for display by the in-vehicle information system comprises the homescreen view for the in-vehicle information system, the homescreen view including the set of user interface icons for accessing the one or more applications including the first application, the user interface icon for the first application comprising a persisted data indication of the persisted data.

21. The mobile device of claim 20, wherein when for a second application of the at least one application executing on the mobile device:
the current execution state is a background execution state;

the current output state is a static state; and
persisted data is available,
the homescreen view includes a user interface icon for accessing the second application comprising a persisted data indication of the persisted data for the second application.

22. The mobile device of claim 12, wherein the generated user interface view is defined by the at least one application executing at the mobile device.

* * * * *